(12) United States Patent
Lucivero et al.

(10) Patent No.: US 7,242,487 B2
(45) Date of Patent: *Jul. 10, 2007

(54) PRINT DRIVER SYSTEM HAVING A USER INTERFACE AND A METHOD FOR PROCESSING RASTER DATA

(75) Inventors: Jeanne M. Lucivero, Burlington, MA (US); David D. Smith, Londonderry, NH (US); Frank P. White, Woburn, MA (US); Robert G. Boyle, Methuen, MA (US)

(73) Assignee: Agfa Corporation, Wilmington, MA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1300 days.

(21) Appl. No.: 08/869,244

(22) Filed: Jun. 4, 1997

(65) Prior Publication Data

US 2002/0063877 A1 May 30, 2002

(51) Int. Cl.
*G06F 13/00* (2006.01)
*G06F 3/12* (2006.01)
*G06K 15/02* (2006.01)

(52) U.S. Cl. .................. 358/1.13; 358/1.15; 358/1.9

(58) Field of Classification Search .............. 395/101, 395/102, 103, 114, 115, 116, 117; 358/1.15, 358/1.16, 1.17, 1.3, 1.4, 1.9, 1.13
See application file for complete search history.

(56) References Cited

U.S. PATENT DOCUMENTS

| | | | | |
|---|---|---|---|---|
| 5,559,933 A | * | 9/1996 | Boswell | 395/114 |
| 5,577,172 A | * | 11/1996 | Vatland et al. | 395/114 |
| 5,604,843 A | * | 2/1997 | Shaw et al. | 395/101 |
| 5,615,314 A | | 3/1997 | Schoenzeit | 395/114 |
| 5,619,624 A | * | 4/1997 | Schoenzeit et al. | 395/118 |
| 5,638,521 A | * | 6/1997 | Buchala et al. | 395/311 |

FOREIGN PATENT DOCUMENTS

| | | |
|---|---|---|
| EP | 0767578 | 4/1997 |
| EP | 0843284 | 5/1998 |
| JP | 09102846 | 4/1997 |

* cited by examiner

*Primary Examiner*—Douglas Q. Tran
(74) *Attorney, Agent, or Firm*—Robert A. Sabourin; John A. Merecki

(57) ABSTRACT

A system and method for processing raster data including at least one input computer terminal for creating postscript data, at least one raster image processor (RIP), for processing the postscript data into raster data, and a PrintDrive system for managing and controlling the workflow of image files containing raster image data to a plurality of user selectable output devices.

24 Claims, 59 Drawing Sheets

Image Job: _Job Name_

Page Range:
○ All
○ Pages _____

Separations:
○ All
○ Separations _____

| Log View for NANTARIES | | | | | | | |
|---|---|---|---|---|---|---|---|
| File Edit JobLog | | | | | | | |
| Job ID | | | | RIP Start Time | RIP End Time | Document N | Input Channel | Document O |
| 1 | 0 | 0 | 0 | 06/03/97 16:35:20 | 06/03/97 16:35:41 | Waltham | RIPSimulator | nantares |
| 2 | 0 | 0 | 0 | 06/03/97 16:36:24 | 06/03/97 16:36:42 | Stoke | RIPSimulator | nantares |
| 3 | 0 | 0 | 0 | 06/03/97 16:37:20 | 06/03/97 16:37:41 | Wilmington | RIPSimulator | nantares |
| 4 | 0 | 0 | 0 | 06/03/97 16:38:07 | 06/03/97 16:38:26 | Lexington | RIPSimulator | nantares |
| 5 | 0 | 0 | 0 | 06/03/97 16:38:54 | 06/03/97 16:39:15 | Middleton | RIPSimulator | nantares |
| 6 | 0 | 0 | 0 | 06/03/97 16:39:41 | 06/03/97 16:40:03 | Cat | RIPSimulator | nantares |
| 7 | 0 | 0 | 0 | 06/03/97 16:40:44 | 06/03/97 16:41:05 | Dog | RIPSimulator | nantares |
| 8 | 0 | 0 | 0 | 06/03/97 16:43:11 | 06/03/97 16:43:33 | My Preview Job | RIPSimulator | nantares |
| 9 | 0 | 0 | 0 | 06/03/97 16:44:52 | 06/03/97 16:45:14 | My Proof Job | RIPSimulator | nantares |
| 10 | 0 | 0 | 0 | 06/03/97 16:53:18 | - | Clinton | RIPSimulator | forester |

*FIG. 42*

PRINT DRIVER SYSTEM HAVING A USER INTERFACE AND A METHOD FOR PROCESSING RASTER DATA

FIELD OF INVENTION

The field of invention relates in general to imagesetting and electronic prepress systems and a method for enhancing system workflow. More particularly, the present invention is directed to a system and method for processing page description format data files such as postscript or Pdf data files, into raster data files, (page pixel, image or video data files), and for transferring the raster data to a plurality of output devices.

More particularly still, the present invention is directed to a system for the inputting, tracking, processing, queuing, storing, editing and printing of raster or bit map data, and to a method for providing a nearly continuous output of raster images to a plurality of output devices, such as, imagesetters, platemakers, on-press imagers, digital proofers, digital color printers and the like. Of course, as should be apparent from the following discussion, any application involving the multiplexing of large parcels of data could take advantage of the present invention.

| DEFINITIONS | |
|---|---|
| ALDC | IBM compression/decompression chip |
| Agfa Print Engine Interface Specification, (APIS). | An Agfa proprietary point to point data transmission protocol consisting of a serial bi-directional command channel (APIS serial) and a parallel uni-directional data channel (APIS video) |
| Backup | An operation to temporarily save a job in a dedicated backup area. |
| CDF | Component Description File, A file which contains text string conversions for internationalization. |
| Device API | Generic Application Programming Interface for connecting AGFA devices. |
| EDF | Engine Description File. These files provide a way to set PostScript printer specific features on a more global basis. They differ from PPD choices in that they are persistent for each RIP Bootup and more commonly used to handle default settings. |
| Engine | A hardware device capable of receiving and printing Raster data on film or other media. (For example, Agfa's Avantra family of Engines) (Output printing device) |
| Export | This refers to the operation of providing long-term off-line storage of jobs, or the ability to send jobs to a remote site. |
| Fast Ethernet (100 BaseT) | Communication medium, 100 Mb/sec maximum transfers over Twisted pair wire. |
| Fast Wide SCSI | 16 bits wide and 20 MB/sec maximum transfer rate. |
| Import | This refers to the operation of bringing a job into the PowerMux system from an external media source. |
| Job | One or more related pages together constitute a ▓job▓. This is the smallest entity that can be manipulated by the PowerMux. |
| Job List | Terminology for the list of jobs, that are available for imaging. |
| Job State | Current read-only State of a Job. (E.g., Hold, Imaging, Spooling, etc.) |
| MUX | Multiplexer |
| Null Device Driver | A "dummy" device that adheres to the Device API. All data sent to this device driver is essentially dropped on the |

| DEFINITIONS | |
|---|---|
| | floor, that is there is no interpretation or saving of data. |
| Page | One or more related separations together constitute a "page". For example, "the cyan, magenta, yellow, and black separations for page 3". |
| PPD File | A PostScript Printer Description file. A human readable text file that can be parsed and provides a uniform approach to handling special features of devices that contain PostScript interpreters. These are applied on a job by job basis. |
| PSE | PostScript Environment layer of software with interfaces to front-end PostScript programs and Agfa's RIPs. |
| Separation | A single 1-bit Raster image as output from a RIP. For example, "the cyan separation". This is also referred to as a "take". |
| Take | See Separation. |
| Spindle | Choice of media holding device for use on an engine |
| PRINT | Command user inputs into a front end terminal after completing a document which signals the beginning of a print job. |
| MULTIPLEXER (MUX, MUX CONTROLLER) | Prior art device driver capable of receiving raster data from as many as two RIPs, basic advantage-buffer |
| PRINT DRIVER (a.k.a., Printdrive or PrintDrive) | Device and raster image manager for providing efficient throughput due to buffering of output files. (See also Multiplexer). |
| RIP | Raster Image Processor |
| FLAT | One or more separations of like color formatted for printing |
| FRONT END USER | Graphic arts designer |
| PRINT DRIVE OPERATOR | Workflow administrators for setting priority of output high speed network such as 100 BASE-T |
| PAST ETHERNET | High speed network such as 100 BASE-T |
| CMYK | Cyan, Magenta, Yellow, Black |

BACKGROUND

As known in the art of imagesetting and electronic prepress systems, heretofore, output devices, e.g. imagesetters and more recently platesetters typically have been served by a dedicated Raster Image Processor (RIP) connected between a front-end and an output device. Typical electronic prepress image file sizes, e.g. often greater than 100 Megabytes per page, have previously restricted electronic prepress systems to dedicated proprietary hardware and software systems using parallel data transfer methods to provide high speed data transfer rates between the front-end, the RIP and the output device More recently, use of page description languages, e.g. Postscript™ and PDF™, offered by Adobe Systems of Mountainview Calif., have allowed object oriented text descriptions of large image data files to be transferred efficiently over serial data communication lines, as used in network systems and adopted in electronic prepress systems, for transferring serial image data in page description formats between a front-end and a RIP. Serial data transfer systems offer the advantage that two way communications between the front-end and the RIP allow status information and other commands and files to be transferred in either direction as will be further described below.

Once the image file data is received by the RIP, operations such as image screening, color separating, imposition, trapping and various other prepress image preparation operations result in a final bit map image data file which heretofore has been transferred to the output device over a parallel data transfer interface in order to provide an efficient data transfer rate, thereby, keeping the output device operating at a desired operating speed. Typically, the process of RIPing data, i.e. preparing a final bit map image file for transfer to the output device, has been slow, sometimes causing the output device to remain idle while waiting for a RIP to prepare the next bit map image file.

Even more recently, the use of a RIP multiplexer, (MUX), e.g. MULTISTAR, offered by Agfa Corporation of Wilmington, Mass., has offered the electronic prepress industry some improvement in data throughput, and cost savings, by functioning as a page buffer between one or two RIPs, and a single output printing device. Cost savings and improved efficiency have been realized by either RIPing an image with a first RIP while transferring a previously RIPed image to the output device or by storing RIPed image data for transfer to the output device at an appropriate time after RIPing. This more fully utilizes the output device, or print engine, which is typically an expensive resource. In fact, keeping the print engine busy is a key design goal of any electronic prepress system design.

Typically, for electronic prepress and imagesetting systems of the prior art, a print job required that a specific output device be connected to the system before the job could be processed. For example, a print job requiring a particular imagesetter for an output device, (engine), or a particular media type or size loaded onto the output device, could not be processed into raster data, if the particular output device that was currently connected to the system did not meet the job requirements. Such a condition may cause a system delay or require that a front-end operator physically change the media or output device connected to the RIP in order to continue processing and outputting image files.

Since, the electronic and imagesetting systems of the prior art were not only device dependent but media dependent as well, the queuing of rasterized print jobs was not possible. Thus, the choice of the output device and print media proved to be a considerable hindrance in productivity.

Another expensive resource, front-end operators, are also kept busy since transfer of bit map image data between a RIP and a MUX has been controlled by the front end operator in the prior art system. Such operators are often the image creators and editors and burdening these operators with control of the output process reduces overall system efficiency. By moving control of the RIPing and image output process to a system administrator, the front end operator and the front-end itself become free to function more efficiently.

However, one of the biggest shortcomings of electronic prepress systems of the prior art, heretofore, has been the inability to control and monitor the queuing of output jobs and to make changes in the order or priority of image output either from the RIP of from the output device. Further, prior art systems have offered no user interface which might be used by a system administrator or a prepress shop manager to control the RIPing and output process. Furthermore, due to the costly proprietary hardware and inflexible nature of RIP and output engine hardware, few, but costly, expansion opportunities have been available for the prepress customer.

Another problem of the prior art has been that in order to transfer bit map data between a RIP and a MUX or between a MUX or a RIP and an output device, it has been necessary to use a parallel communication interface in order to provide data transfer rates which are fast enough for transferring very large image data files, e.g. image data files in excess of 100 Mbits per page, at rates which provide efficient workflow. Prior art bit map data parallel transfer interface systems, e.g. Agfa Printer Interface Standard (APIS) or Small Computer Systems Interface (SCSI) systems, use a data transfer protocol to identify the data file format and convert serial data into 8 bit parallel data formats. Then, the 8 bit data is transferred over parallel data interface cables which provide a plurality of separate wires bundled together, each transmitting data in parallel. However, since parallel data transfer methods are restricted to one way data transfer, e.g. between the RIP and MUX or between the MUX or RIP and an output device, a serial data channel has also been provided bundled within, or in addition to, the parallel data interface cable to provide two way communication for protocol and other message or file communication between the RIP and the MUX or between the RIP or MUX and the output device or between the front-end and the RIP, the MUX or the output device. One significant draw back of a parallel data transfer interface has been that the cable length is limited in order to maintain efficient and effective data transfer. In some operations, cable length may be limited to about 25 feet requiring that the RIP, MUX and output device each be locally connected to each other and usually all within the same room. This shortcoming of the prior art has limited prepress systems to local connectivity and slowed the development of automation features needed in modern prepress workflow environments. A need exits for better overall control of the RIP, MUX and output process by a system administrator. Features such as job queuing, equipment swapping, and manipulating, editing, storing and transferring previously RIPed bit map image data are needed in the modern prepress environment.

For electronic prepress systems which have employed imagesetters as print engines to create pages, typically, these devices have been driven by a dedicated RIP or a MUX. The RIP/Imagesetter or RIP/MUX/Imagesetter combination has been very productive in creating pages. Except for the most complex jobs, the RIP has advanced so that it is not the bottleneck in the pre-press workflow of page creation.

Today's needs for developing large format imagesetters (and platemakers and on-press plate imaging) go well beyond creating just pages. These devices produce press size flats in film or plate that may contain four, eight, or more pages. These devices have also been driven by a RIP or MUX, but unlike page format imagesetters, the RIP can be the bottleneck in creating press format films and plates.

As the needs of the electronic prepress industry steadily move towards large format imagesetters and the direct-to-plate workflow, it becomes imperative that the output devices be supplied data at rates which meet their specified throughput requirements. This means that the workflow system must be able to perform at or better than engine speed. Notwithstanding the advent of RIPs operating at faster processing speeds, direct RIP to engine configurations cannot guarantee meeting these requirements, especially as large-format, very complex jobs become more and more common.

In addition, with the advent of platesetters and direct-to-press prepress systems, a need also exists to provide a digital proofing device capable of providing either a color or black and white proof of the final image since films used to provide analog proofs have often been eliminated from the prepress workflow. Such proofing systems may accept image files as page description data, screened bit map data or bit map data which has not been screened. A need therefore exists to redirect image data to a proofer, and that data may need to be prepared in an appropriate format for output by the proofer.

Thus, there exists the need for an electronic prepress system that can meet these data requirements to drive an output engine at speed, to redirect appropriately formatted data to a proofer, to queue store or manipulate the priority of image output files and to provide overall control of the RIPing and output functions of a modern prepress system to a system administrator, while maintaining high amounts of "production time" at the front end workstations and the output devices.

SUMMARY OF THE PRESENT INVENTION

In order to overcome the disadvantages of the prior art, the present invention provides a system and method which allows a FRONT END user to input parameters for a print job, select an off-line engine or other output device including a proofer, and execute a PRINT command without the need of the specific output device and/or print media having to be contemporaneously connected to the system.

The present invention provides a print drive system which offers improved throughput and cost savings by functioning as a multi-page buffer for more than one RIP connected to more than one imagesetter. The present invention also provides a new system design and concept in which the print driver, (also referred to as a print drive), is a device and raster flat manager, called a PrintDrive, which accepts compressed RIPed data in addition to acting as a Multiplexer or MUX of the prior art.

The present invention is also directed to a system which allows for a "RIP ahead" approach to electronic prepress systems, e.g., the processing, queuing, storing and proofing of raster data designated for engines and media that are not physically connected or available, thereby creating virtual engines and media.

For digital platemaking especially, plate remakes and backups can be previewed from the RIP. Since the system of the present invention allows for a full disconnect of the Ripping process from the imaging process, similar jobs can be grouped together. This results in a more efficient use of the image- or platesetter and also allows for more jobs to be processed.

The present invention is a print drive and system operating within a standard network environment. For example, the present invention may connect with RIPs configured to output compressed raster data over a standard network interface.

For other industry standard RIPs which output through an APIS interface (also known as APIS RIPs), connections within a network can be made through an "APIS-in" interface board.

The present invention is also directed to a print drive system having a Remote and Local Graphical User Interface which allows users to view the status of the Ripped jobs, as well as, to manipulate and control the timing and priorities of the output. The print driver,or print drive can be controlled from any computer system running Windows 95 Windows NT operating system or the Macintosh OS Operating System in the network. The user can determine a preferred set of parameters that become selectable at print time. Previewing raster data is available as well, regardless of the number of connected RIPs.

The print drive system of the present invention acts as an extensive file buffer with the ability to back up raster data to external media or file servers. In digital workflows, the system of the present invention offers Digital Imposition proofing in black and white, as well as color, to a large format proofer directly from the bitmaps stored for final output.

For networked systems, communication from the RIP(s) to the print drive is over fast ethernet. Through hardware compression and decompression, the network transfer times are reduced, and the disk space required for storing the bitmapped data is reduced. The compressed data is sent from the RIP to the print drive of the present invention over fast Ethernet. This eliminates the distance bottleneck typical of the prior art, (from the use of APIS cables), so that the print driver can be located near the platesetter (which is down in the plate making facility) and the RIP can be located in the pre-press department. Through local and remote Graphics User Interfaces, users and operators can track the RIPped jobs, change priorities and imaging queues.

The print drive system of the present invention can also be connected to prior art RIPs that are not configured to output compressed raster data but APIS data instead. By installing a hardware conversion system for converting the APIS data to the desired state. These RIPs can be hooked up to the print drive of the present invention in which previewing, buffering and backup features of the present invention can be utilized.

The electronic prepress system and method of present invention is designed to meet the data rate requirements of the current and future engines of the industry, as well as to provide flexibility for expanded configurations and enhanced workflow scenarios.

The present invention comprises a system for creating, storing and processing a plurality of printable image files, said image files containing postscript data, said system network comprising, at least one input terminal device for generating the postscript data into the image files to be printed; at least one raster image processor for receiving the postscript data from said input terminal device and for converting the postscript data into raster data; and, a print drive for receiving the raster data from said raster image processor and for directing the raster data into at least one output device, said print drive further including a graphical user interface.

It is an object of the present invention to provide an electronic prepress system having the capability to efficiently maximize use of print engines by providing a nearly continuous output of print jobs.

It is an object of the present invention to increase workflow productivity.

It is an object of the present invention to provide an electronic prepress system having the capability to queue a plurality of jobs.

It is another object of the present invention to provide an electronic prepress system having the capability to enter job parameters for a job which designates either an off-line output device or an output device which is not physically connected to the system, (virtual engine).

It is another object of the present invention to provide a electronic prepress system having a user interface.

It is another object of the present invention to provide an electronic prepress system having a single Ripping function for Ripping data to a plurality of images.

It is another object of the present invention to provide an electronic prepress system with expansion capabilities.

It is another object of the present invention to provide an electronic prepress system with the ability to conditionally execute print jobs.

It is another object of the present invention to provide an electronic prepress system capable of reducing the time for the front-end to become free to send another job by allowing more jobs to be queued up to the RIP from the front-end.

It is another object of the present invention to provide an electronic prepress system capable of storing ripped jobs on the PrintDrive disk drive(s) utilizing data compression.

It is another object of the present invention to provide an electronic prepress system that eliminates the distance bottleneck typical of the prior art, (from the use of APIS cables), so that the print drive can be located near the platesetter (which is located in the plate making facility) and the RIP can be located in the pre-press department.

DESCRIPTION OF THE DRAWING

FIGS. 27–39 illustrate the Pilot GUI of the present invention.

FIGS. 40–46 illustrate other additional views of the present invention.

DESCRIPTION OF THE PREFERRED EMBODIMENT

Figure 1:
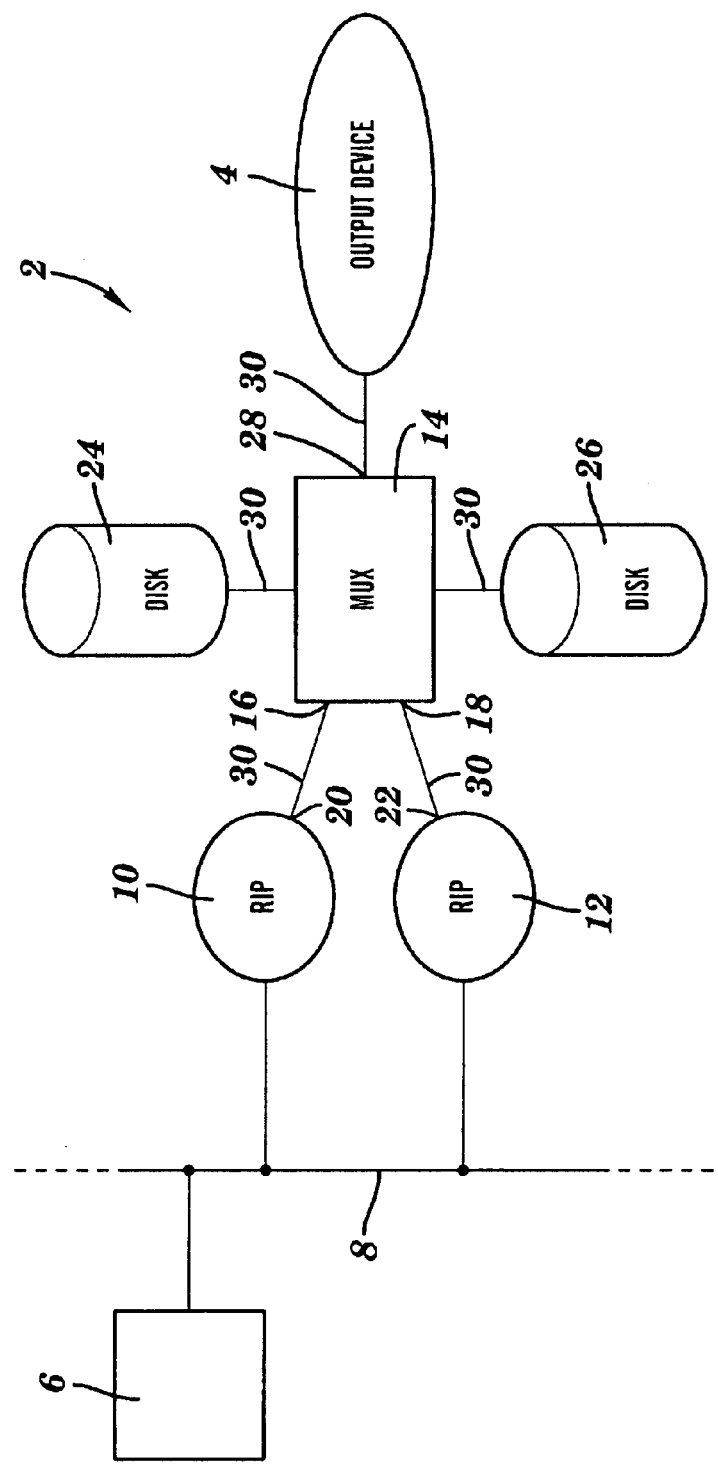
FIG. 1 is a flow diagram illustrating an electronic prepress system of the prior art.

FIG. 1 illustrates a prior art prepress system, referred to generally by reference numeral 2 comprising an output device 4, at least one computer terminal or front-end 6, two raster image processors 10, 12, (RIPS), a multiplexor 14, (MUX) and an output device 4. The front-end 6 is for creating, editing or otherwise preparing image data for printing and especially halftone black and white or color printing as may be output by an imagesetter or platesetter for eventual image reproduction by a printing press using a printing plate. The front-end 6 interfaces with a network 8 which is connected to two raster image processors 10, 12, (RIPs). The RIPs 10 and 12 receive image data from the front-end 6 over a network serial data transfer interface 8. Such image data is typically in the form of a page description language, e.g. a Postscript of PDF or other, object orient text representation of the image to be printed.

A Multiplexer 14 (MUX) includes two input ports 16 and 18 connected to the output port 20 and 22 of the RIPS, 10 and 12. Two large format disk drives 24 and 26 act as image data buffers and are included in the MUX 14 for storing image data. The primary purpose of the MUX 14 is to function as a page buffer for the output device 4. A MUX output port 28 connects with the output device 4. In the prior art, all data transferred from the RIP output ports 20 and 22 to the MUX 14 and from the MUX 14 to the output device 4 or from the MUX 14 to the disk drives 24 and 26 has been bit map raster data and the data transfer has been made over parallel data transfer cables 30. As stated in the Background Section, some of the biggest shortcomings of the prior art has been the inability to manage the RIPing and outputting functions of the prepress process by a system administrator and the costly proprietary hardware with few, but costly, expansion opportunities provided for the prepress customer. In one important embodiment of the present invention, a print driver is employed as a replacement for, and an extension of, the Multiplexer of the prior art.

Figure 2:
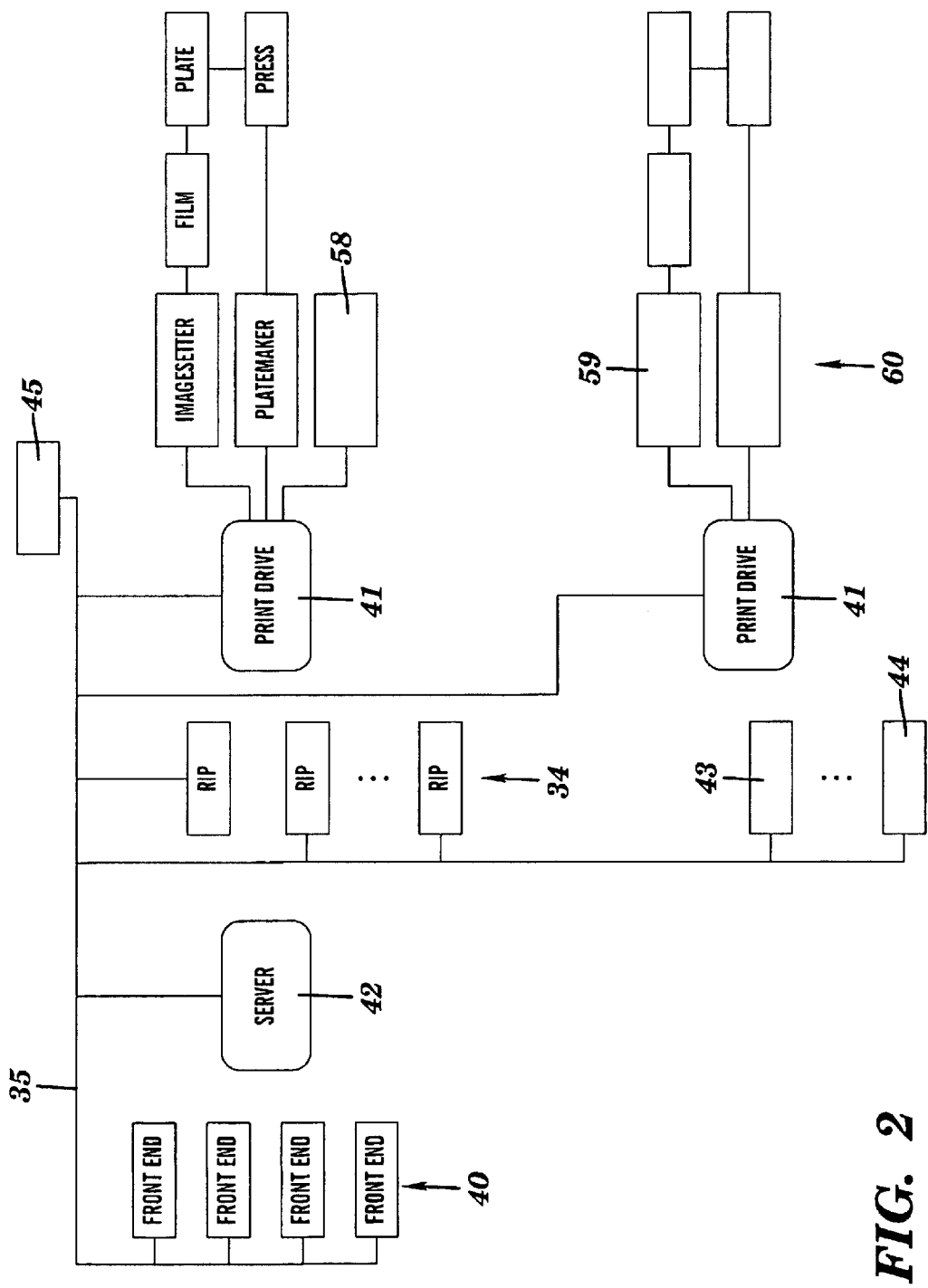
FIG. 2 is a flow diagram illustrating one embodiment of an electronic prepress of the present invention.

FIG. 2 shows how for one embodiment of the present invention is configured for controlling RIPing and output workflow in a prepress system and for providing more flexible operating and expansion options to the prepress customer.

A Prepress System generally referred to by reference numeral 32 includes a plurality of RIPs 34 connected to network 35. The network 32 may further include one or more front-ends, referred to generally by reference numeral 40, one or more print driver 41 one or more servers 42, for storing image and other data files, a proofer 43 or other output device 44 and another computer system 45 which may be used for system administration. The network connected components listed above and other network connected components may be local or remote to the print drivers 41 of the present invention and the print drivers 41 may also be local or remote with respect to each other.

In the preferred embodiment, a plurality of output devices referred to generally by the reference numeral 46 are connected to the print drives 41. The output devices 46 may include any output device but particularly represent imagesetters, platemakers and/or on-press imagers for outputting raster bit map image data. As known in the prepress art, raster bit mapped data typically comprises halftone or otherwise screened images for eventual transfer onto a printing plate for reproduction by a printing press. Such output devices may require proprietary or non-proprietary serial or parallel image data transfer from the print drivers 41, or they may require descreened bit map data when the output device is a proofer for providing a continuous tone proof of the image to be reproduced.

The Rips 34 may be software RIPs which may be located in the front-end 40, having an operating system, e.g. Windows NT™, UNIX™ or MAC OS™, or they may be dedicated hardware RIPs, such as, the AgfaStar™ hardware RIP, available from Agfa Corporation, Wilmington, Mass.

Figure 3:
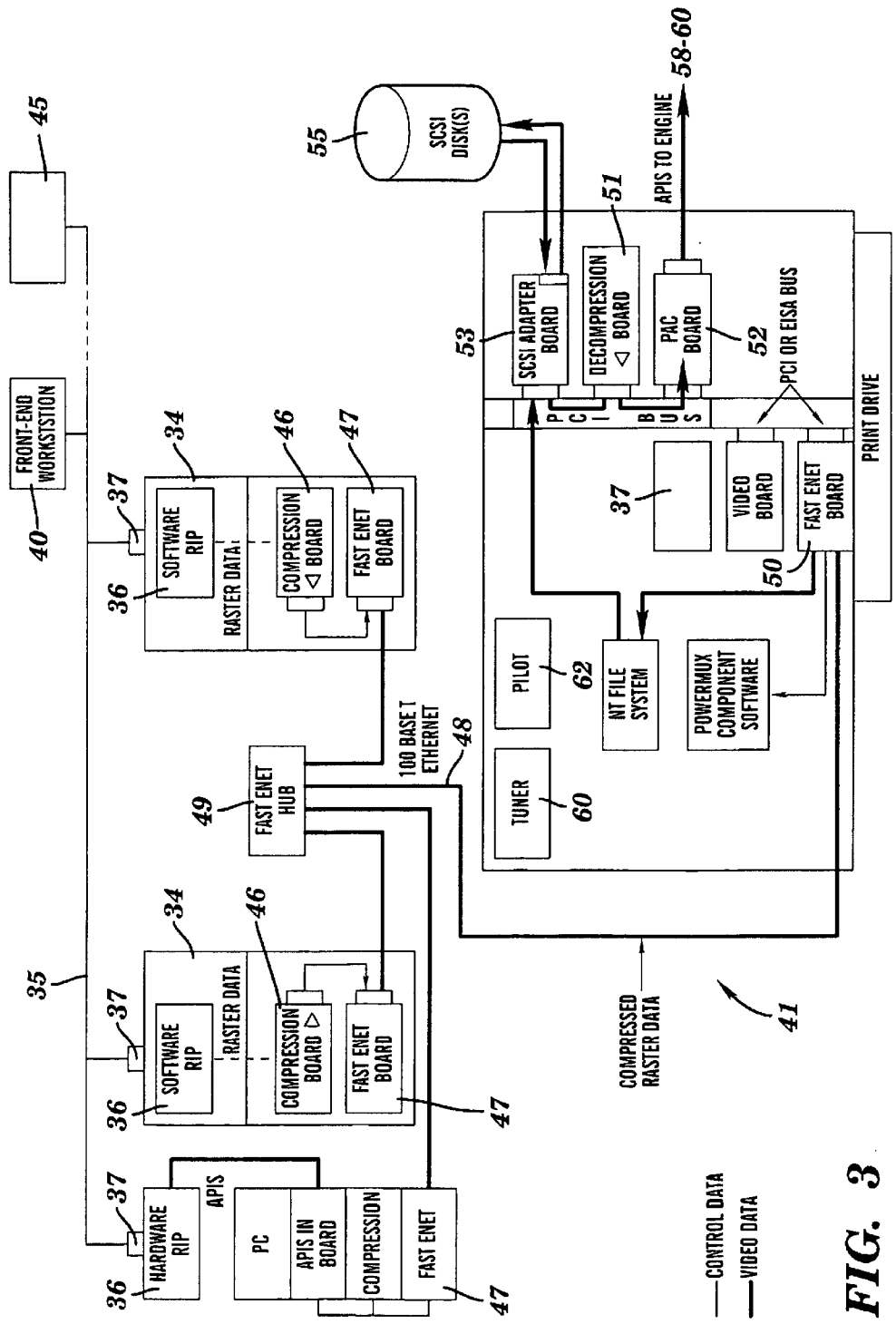
FIG. 3 is a diagrammatically representation of a second embodiment of the present invention.

FIG. 3 shows how in one important embodiment of the present invention, networked RIPs 34 comprise software and hardware RIP modules 36 for standard raster image processing functions, such as, screening, trapping, imposition, page or image combination, color separating, or, color management of image data. The RIPs 34 each include an input network interface module 37 over which text page description or other types of input image files are received from the font-end 40. It will be appreciated from FIGS. 2 and 3 that each RIP 34 on the network 35 can be accessed by any front-end 40 or by the server 42 or other computer system 45, any of which may be either local or remote.

The input network interface module 37 may also serve as an output network interface module as represented in FIG. 2 wherein a single network interface connection connects each RIP 34 to a single network 35, or for in the preferred embodiment shown in FIG. 3, separate fast network connections 47–49 connect each RIP 34 to a print drive 41 via hub 49 offering maximum system performance.

With further reference to FIG. 3, each RIP 34 includes a data compression module 46 for compressing bit map data. The compression module 46 allows the use of serial bit map data transfer over the network 35 instead of parallel bit map data transfer. By substantially compressing files to a size which allows data transfer over the serial network 35, serial data transfer is as fast or faster than parallel data transfer interfaces used in the prior art. The compression module 46 may compress RIPed data for output over the network interface 37 to network 35. Alternatively, compression modules 46 may compress RIPed data for output over a fast network 48 either connected directly to one or more output devices 46 or to one or more print drives 41. In the latter, each RIP 34 also includes a fast network output interface module 47 which takes compressed data from the data compression module 46 and delivers it to the fast network 48 which may include a local fast network hub 49.

The print drive 41 comprises a plurality of software modules operating on a standard computer platform configured for efficient print driving functions. The print drive hardware may comprise a number of interface boards or modules including a fast network input interface 50, connected to the fast network 48, or it may include another network interface module 37, for interconnection to the network 35. The print drive 41 also includes a data decompression module 51 for decompressing image data files, at least one high capacity disk drive or other data storage medium 55, a memory interface module, e.g. a SCSI adapter, 53 and other output interface boards 52 which may include an APIS or other parallel data transfer adapter module 57 for interfacing with output devices 58–60. The output devices may include a descreening module connected to a digital proofer.

The print drive 41 includes a number of different software modules operating in parallel with a computer system operating system such as WINDOWS NT. Both a local Graphical User Interface and a Remote Graphical User Interface are supported by the print drive software modules. The PrintDrive Tuner GUI 60 controls the configuration and operation of the Print drive 41. The Pilot GUI 62 is directed to provide an interactive link between the front-end users, typically, MAC and PC networked users, and the PrintDrive operator, typically a system administrator or prepress shop manager. Preferably, the PrintDrive Tuner GUI 60 is run locally on the print drive workstations. The Pilot module 62, however, can be run either locally or remotely as can all other aspects of the print drive software modules.

The Tuner 60 which is a local GUI, controls the configuration and operation of the print drive 41 and is based upon standard Windows NT technology. The remote GUI, Pilot 62, which may reside in the front-ends 40 or other terminals, e.g. 45, is designed to accommodate a number of different user interface types, such as, MACs and PCs.

FIG. 3 diagramatically shows the control relationship between the local print drive software which configures and controls the activities of the print drive set up, job queuing and output using the modules 60 and 62 while the operating system Window NT controls the receiving, storing and output of image data.

PrintDrive Tuner

To access the PrintDrive Tuner GUI of the present invention, a PrintDrive operator clicks on the appropriate box from a Windows NT GUI (It will be understood that "PrintDrive" is a commercial description and trademark for the print driver of the present invention.). This method of access is well known in operating systems utilizing GUIs, such as, Windows and Macintosh operating systems ™, where applications are typically started from a main menu or pull down window.

Figure 4:
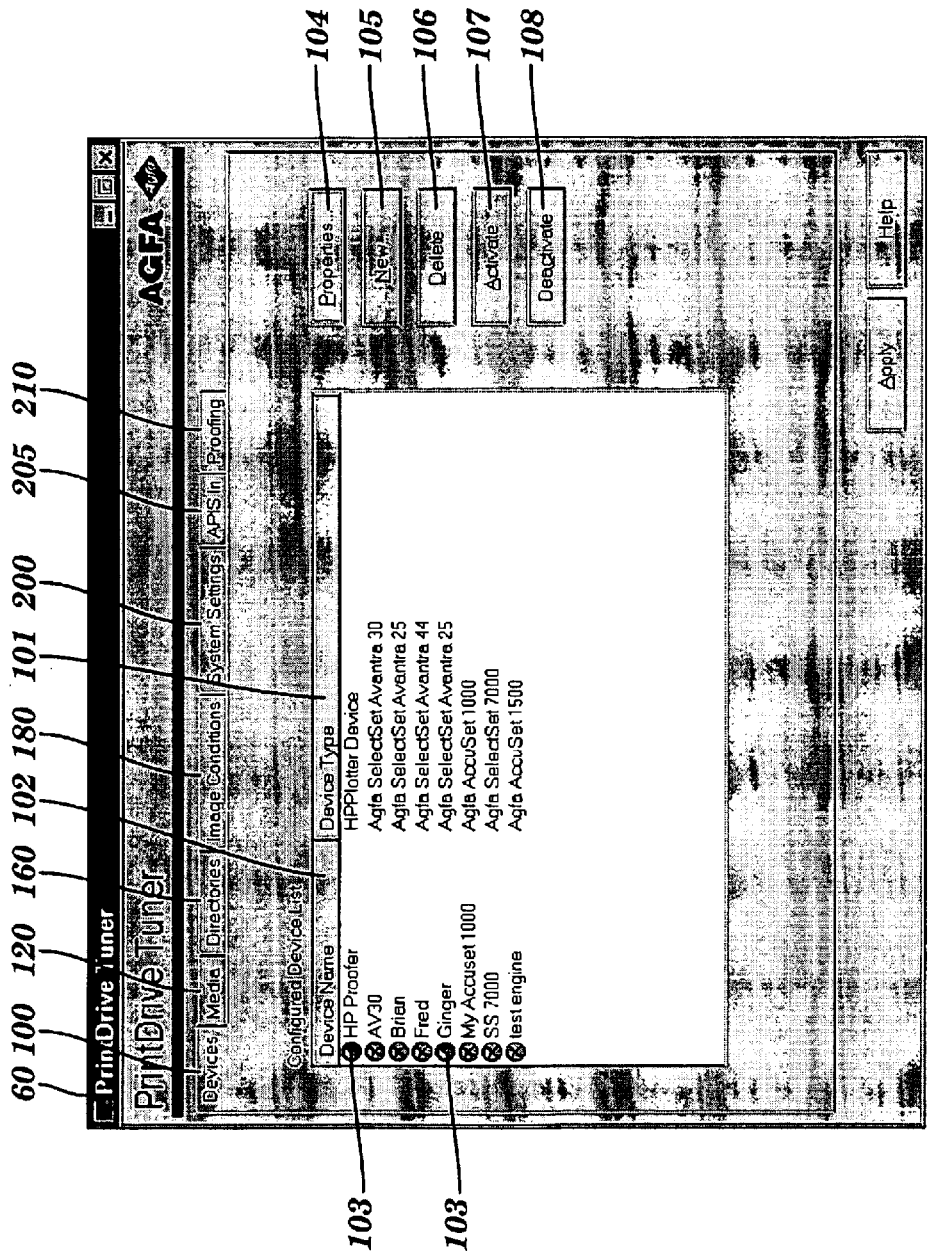
FIG. 4 illustrates the Tuner GUI of the present invention.

FIG. 4 shows how after clicking on the appropriate Tuner button from a Windows menu panel, the PrintDrive administrator enters into the PrintDrive GUI environment through the Tuner Dialog Box 60. As shown in FIG. 4, the Tuner Dialog Box 60 is displayed with the following tabs: Devices tab 100, Media tab 120, Directories tab 160, Image Conditions tab 180, System Settings tab 200, APIS In tab 205 and Proofing Tab 210. It will be understood by those skilled in the art that additional tabs may be added to the Tuner dialog box 50 in order to implement other functions, such as, notification upon job completion.

With further reference to FIG. 4, it is apparent that the column of Device Names 102 are preceded by a column of round bullets, some of which bear a symbol resembling the letter "x," whereas the bullets generally indicated by reference numeral 103 do not have the "x" symbol. The bullet 103 generally indicates that the referenced output device is currently attached to the system. From FIG. 4, the PrintDrive administrator is visually provided with the information that two engines attached are currently attached to the system, a HP Plotter named HP Proofer and an Agfa SelectSet Avantra 25 named Ginger. Although not determinable from FIG. 4, the bullets may appear as a different colors. For example, the bullets generally referenced by 103 may preferably be green to further emphasize that the devices are attached. Of course, as it is apparent to one skilled in the art, other colors, as well as, other symbols, such as, check marks or cross hatches, to name a few, may be used differentiate between an active/attached and inactive/unattached output devices.

A system or PrintDrive administrator configures the PrintDrive system for outputing data as follows.

Figure 5:
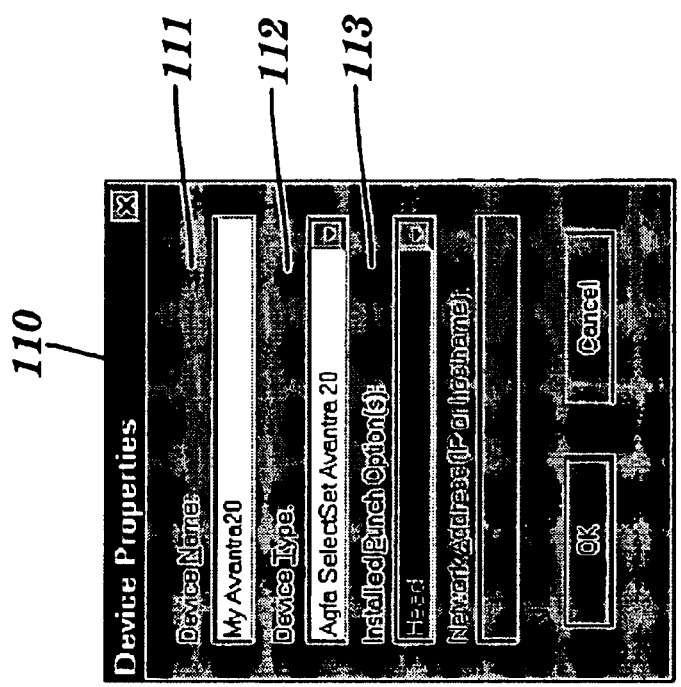
FIG. 5 illustrates the Device Properties dialog box of the present invention.

FIG. 5 shows how when the system administrator clicks on the New button 105 to add a new device from the Tuner dialog box 60, a Device Properties dialog box 110 appears for entering the Device Name 111, Device Type 112 from a pick list and device-specific information such as Punch configuration/setting 113. With further reference to FIG. 5, an Agfa SelectSet Avantra 20 has been entered for the device type 112 which has been given a Device Name 111, of "My Avantra 20," which typically is a pneumonic or pseudonym.

Figure 6:
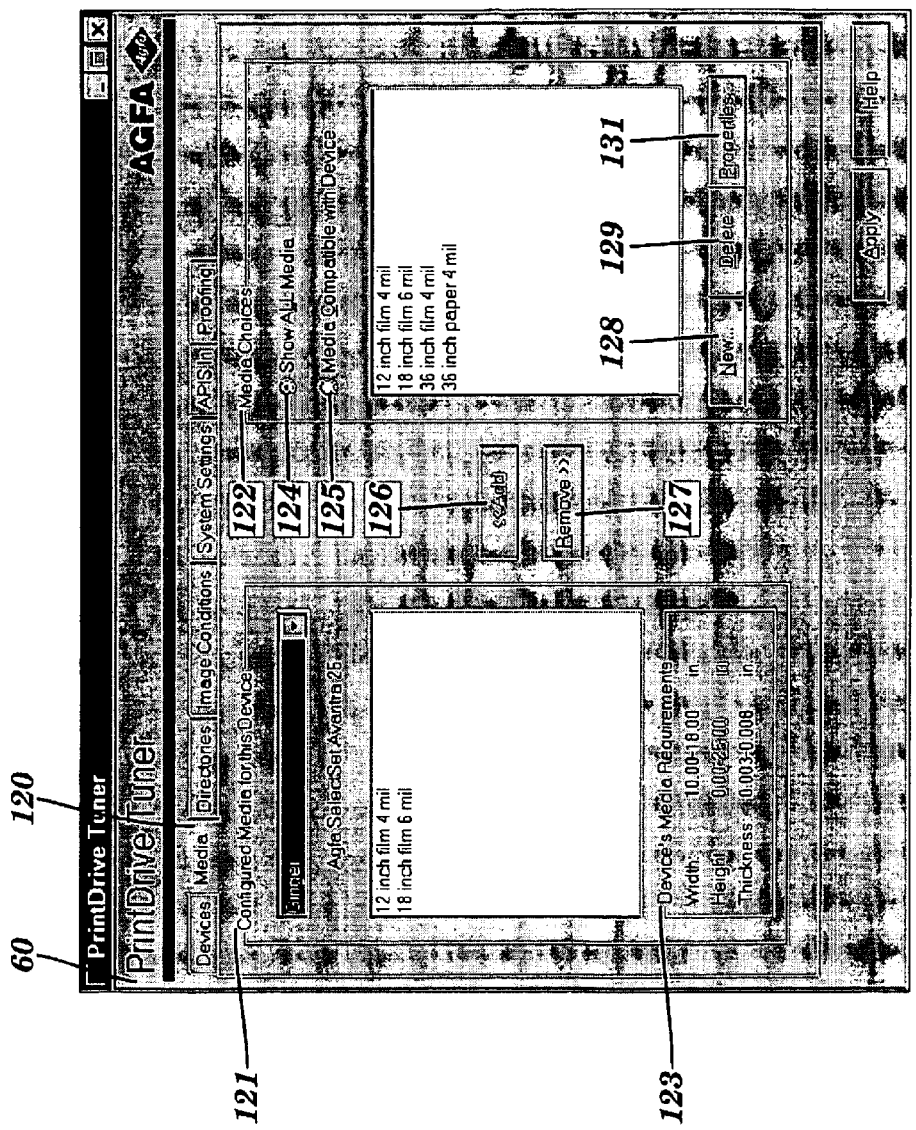
FIG. 6 illustrates Media tab of the Tuner Dialog Box of the present invention.

With reference to FIG. 6, from the Media tab 120 of the Tuner Dialog Box 60, the PrintDrive administrator names all media types for all intended Engines. These media names are user defined up to a limit of 20 alpha-numeric characters. (As will be described, typically, the media characteristics are encoded in the name, so the front end user can easily identify a specific media when presented with the list at PRINT time via the PPD.)

When the PrintDrive operator names the media, the media characteristics associated with that name must also be entered, such as, media type, media size, and media thickness.

When the user makes the association between engine name and media name, validation will be performed by the Tuner software to make sure that the selected media is supported on the selected engine.

FIG. 6 shows how media names have been assigned for the engine named Ginger. Because Ginger is an Avantra 25 engine, only 12 inch film and 18 inch film from the available media choices are allowed to be assigned to Ginger. The Tuner software will perform validation checking to ensure that only valid media assignments are made for the selected engine.

The Show All media check box 124, when checked, shows all the media that has been defined. When the Show All media check box 124 is not checked, only the defined media names that are valid and as yet unassigned are shown for the current device.

The Add button 126 allows highlighted available media choices to be configured for the selected device. Verification is performed, and only valid selections will be assigned. Once the media is configured for the selected device, the choice is removed from the Available Media Choices box when the Show All media check box 124 is not checked.

Figure 7:
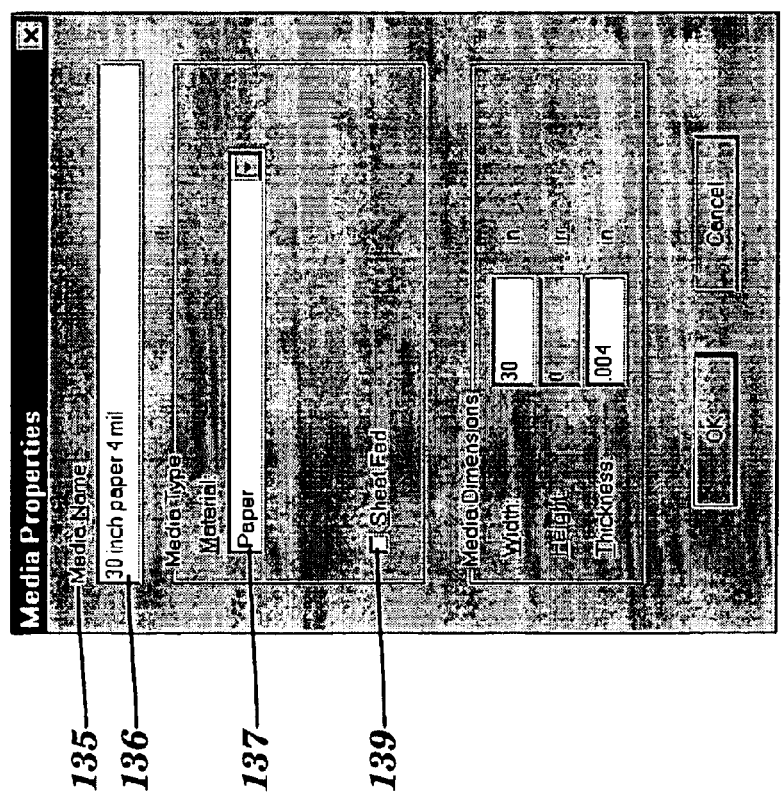
FIG. 7 illustrates the Media Properties Dialog Box of the present invention.

FIG. 7 shows how when the PrintDrive administrator clicks on the New button 128 to define new media names, a Media Properties dialog appears. From the Media Properties box, the PrintDrive operator enters the media name in the Media Name window 136, selects the material type from a pick list in the Material window 137, e.g., film, paper, plate and checks whether the media is sheet fed in the Sheet Fed box 139 as opposed to being Roll fed. If the media is Roll Fed, the height field is grayed out, as it is not applicable.

FIG. 6 further shows how the media requirements 123 for the engine named Ginger are displayed. The assigned media names are 12 inch film and 18 inch film, the tray selection PPD option list in the PrintDrive PPD will show the selections illustrated in TABLE 1. The units of measure for entering specifically media size are Inches or Centimeters, the default being inches.

TABLE 1

| Ginger: | 12 inch film |
|---------|--------------|
| Ginger: | 18 inch film |

Figure 8:
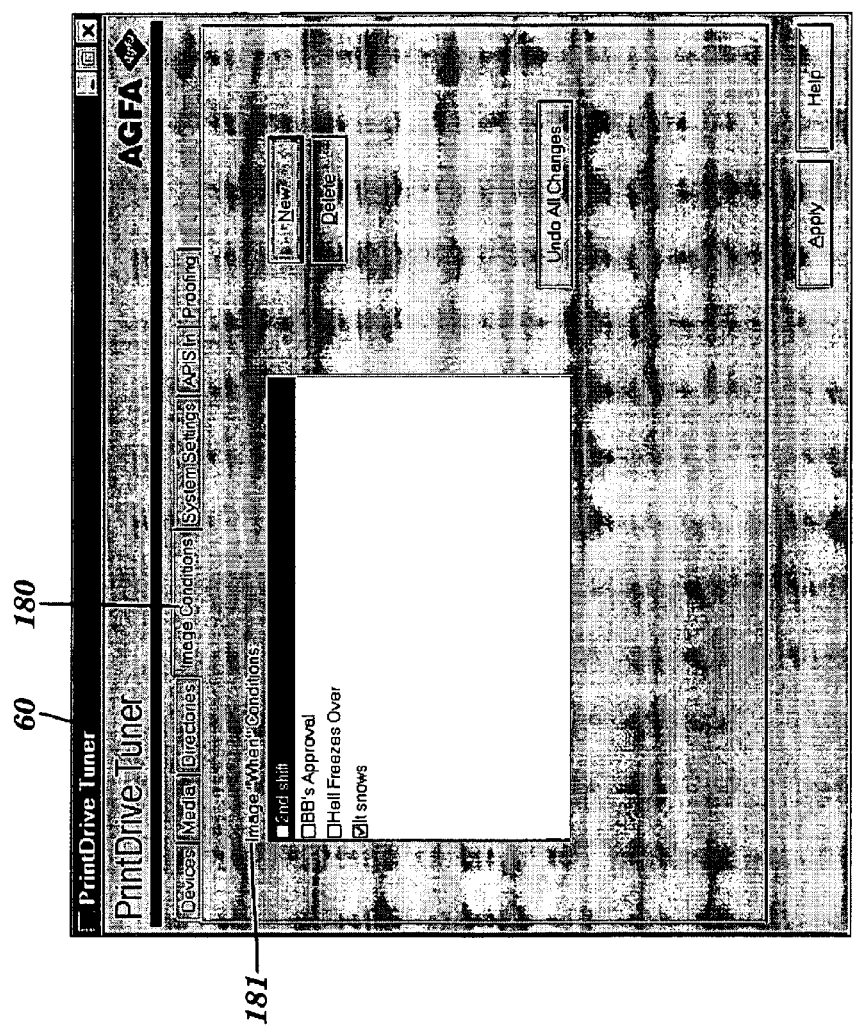
FIG. 8 illustrates the Image Settings Tab of the Tuner Dialog Box of the present invention.

With reference to FIG. 8, from the Image Settings tab 180 of the Tuner Dialog Box 60, the PrintDrive operator can control jobs by entering Image When Conditions which are user-definable strings of up to 40 character limit.

There are six built-in choices for the Image When Conditions: Immediately (Printer Default), Hold, Preview, Manual Proof, Color Proof and Monochrome Proof. Immediately implies that a job has no specific user defined hold condition which must be satisfied for it to image, so the order that it images relative to other queued jobs is based upon all other output references specified by the user.

Hold implies that a job will be stored on hard disk, and that it cannot image without operator intervention. Preview implies that the job is to be Previewed once it is resident on the PrintDrive, and it cannot output until Approved. Upon Approval from the Preview application, the user will be able to specify a subsequent Image When condition for that job if desired.

Manual proof implies that a job will be proofed before imaging via the Pilot Subsequent Image. Image When conditions can be applied from the manual Proofing Dialog box in the Pilot, whereby individual pages or whole jobs can be selected for proofing.

If the job is on hold for either Color or Monochrome proofing then the job is proofed automatically when it is received at the PrintDrive. All pages of the job are proofed.

As in the case of user defined engine and media name strings described above, the Image When Conditions are presented in the PPD as a PRINT option as illustrated with example in TABLE 2 below.

TABLE 2

| IMAGE WHEN CONDITIONS: |
|------------------------|
| Printer Default |
| Immediately |
| Hold |
| Preview |
| Manual proof |
| Color proof |
| Monochrome proof |

As it will readily be understood by one skilled in the art, the PrintDrive administrator may optionally set up a preferred method for notification for when a job completes, or when an error occurs on output. Preferably the choices may be; No Notification, Email, Beeper, or Alarm.

For example, No Notification would specify that the user does not care to be informed. Whereas an Email option would prompt the user for an Email Address whereby job information and print status would be emailed to a specified address. Paging and wireless messaging functions that can send full text messages to any pager or wireless messaging handset could also be employed. The default could be set up for No Notification.

Figure 9:
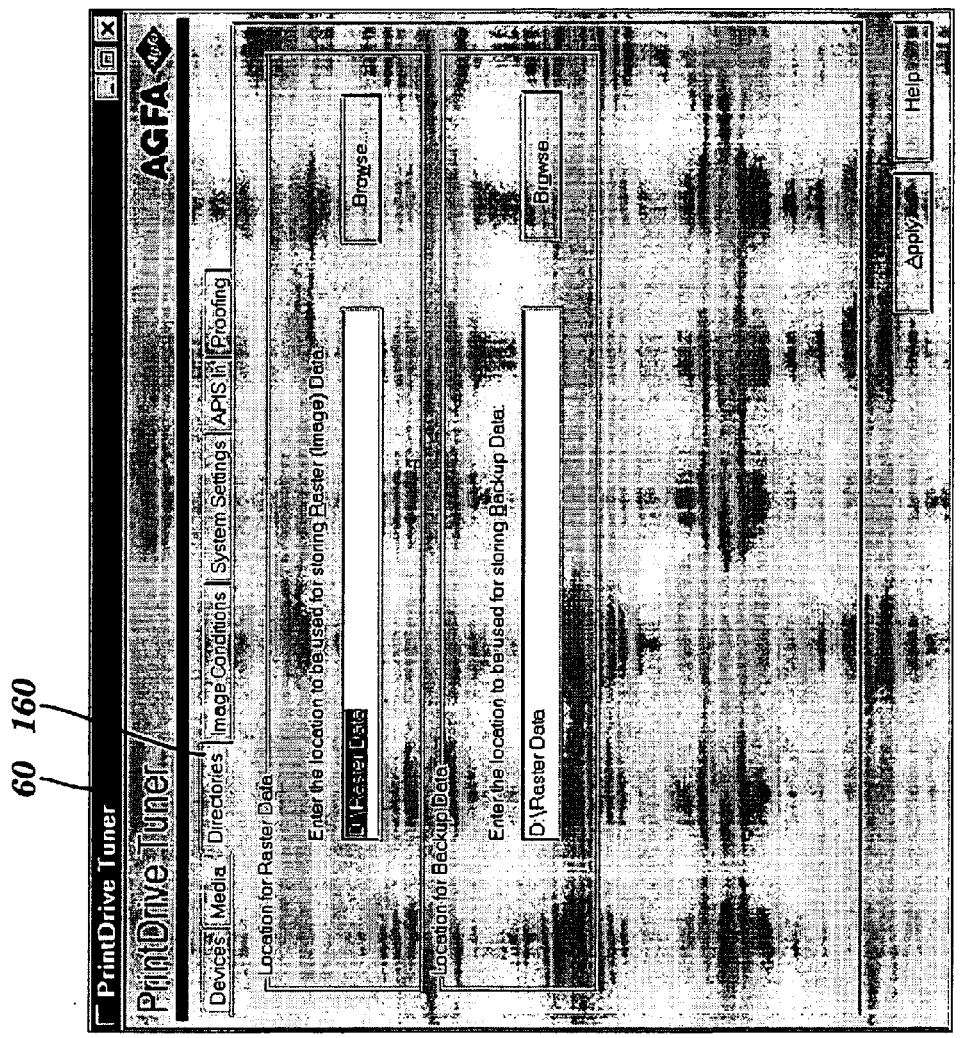
FIG. 9 illustrates the Directories Tab of the Tuner Dialog Box of the present invention.

The user can specify the locations for storage of the video data files via the PrintDrive Tuner. The video drive array must be attached locally to the PrintDrive workstation in order to meet output performance requirements. FIG. 9 shows in general how the data may be directed to a designated drive and/or backed up.

Figure 10:
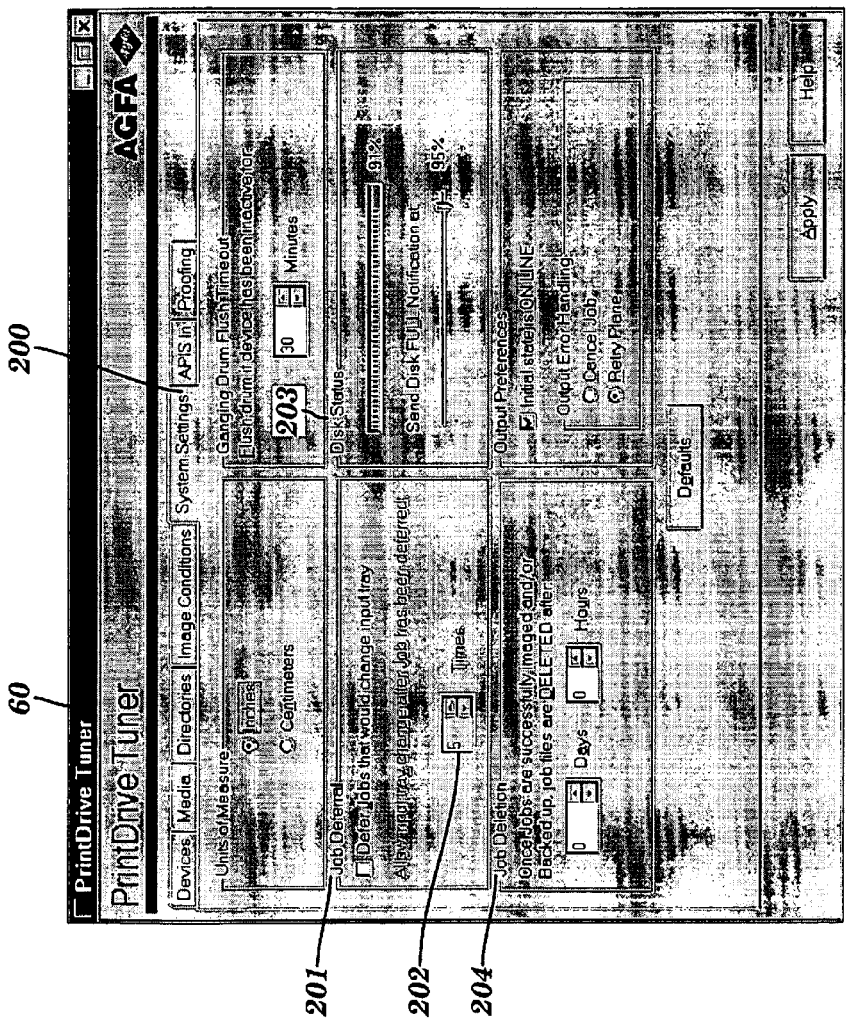
FIG. 10 illustrates the System Settings Tab of the Tuner Dialog Box of the present invention.

With reference to FIG. 10, a PrintDrive administrator can define the maximum number of jobs that can precede the next job in the job list before selecting a new spindle command via the System Settings tab 200. The Job Deferral option 201 is used to avoid unnecessary spindle swapping if the order of output is unimportant to the user. For example, the imageable jobs in the job list could be in such an order that every other job is on "spindle 1." Normal processing could cause a spindle swap for every job on a multiple spindle Engine. This option could be used to alleviate this inefficiency, by deferring the output of that "next imageable job that required a spindle change" until a later time. With further reference to FIG. 10, the default setting is disabled, meaning that spindle changes would occur as required for the "next-imageable job". However, as referenced by numeral 202 in FIG. 10, when Job Deferral 201 is enabled, the default number of jobs is 5.

With further reference to FIG. 10, through the System Settings tab of the Tuner, the PrintDrive operator may select a percentage value for disk usage 203 that will signal a Disk FULL notification when reached.

With continued reference to FIG. 10, through the System Settings tab of the Tuner, a default value for the file deletion preference 204 can be set to apply a delay to the actual deletion of files specified by the Post Imaging Options. The default deletion delay is 0 days, 0 hours. The valid values are 00–365 days, and 00–23 hours. It can be overridden on a per job basis from the PrintDrive Pilot discussed below.

Figure 11:
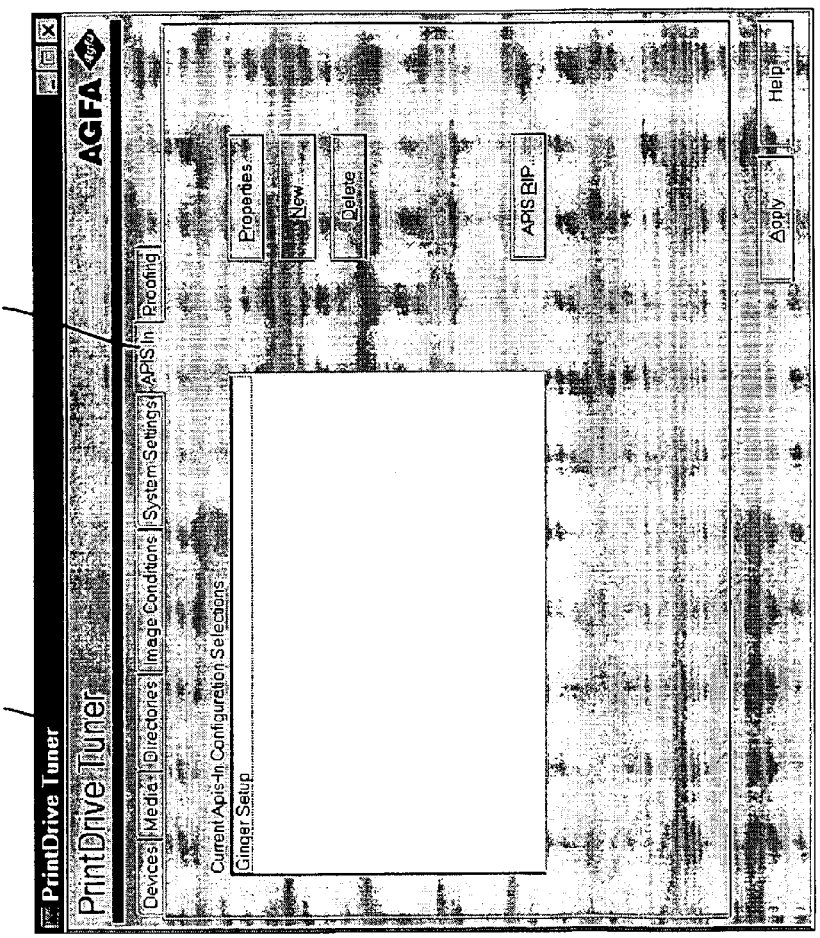
FIG. 11 illustrates the APIS In Tab of the Tuner Dialog Box of the present invention.

FIG. 11 shows GUI of the present invention allows for the attachment of prior art RIPs to interface with the PrintDrive and electronic prepress system of the present invention. For prior art software and hardware RIPs limited to interfacing with only physically attached output, (and therefore, in which RIP Ahead jobs are not possible), the APIS In tab dialog box 205 allows for "backwards compatibility" of these prior art or "pre-network compatible" RIPs.

Figure 12:
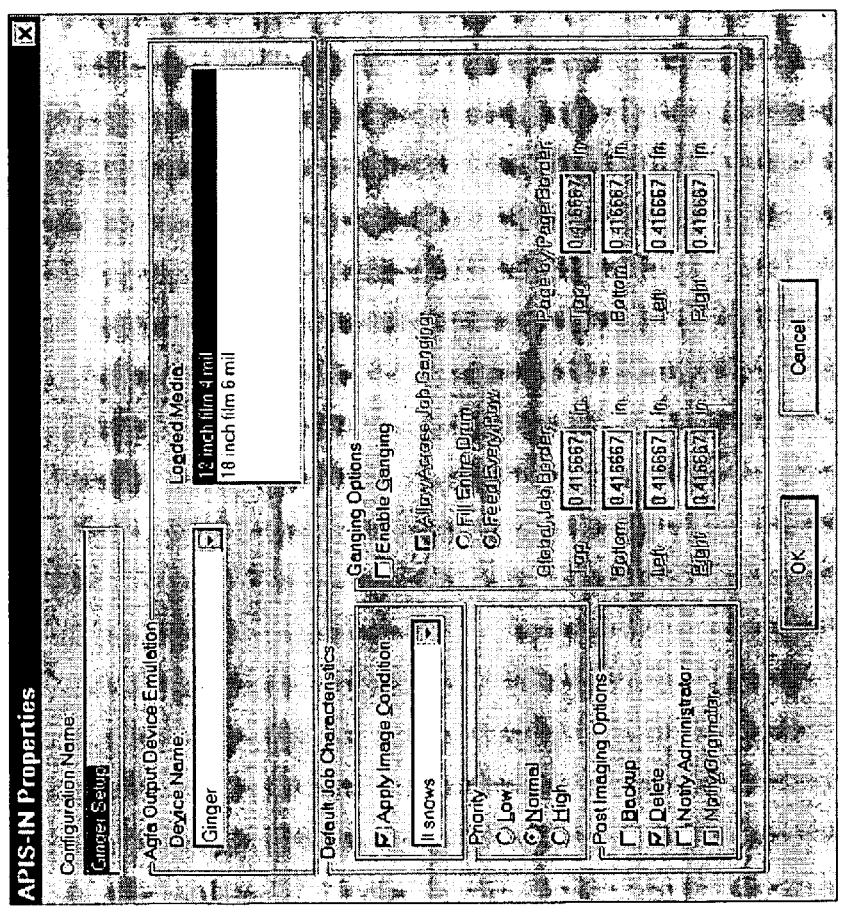
FIG. 12 illustrates the Properties Dialog Box of the present invention.
Figure 13:
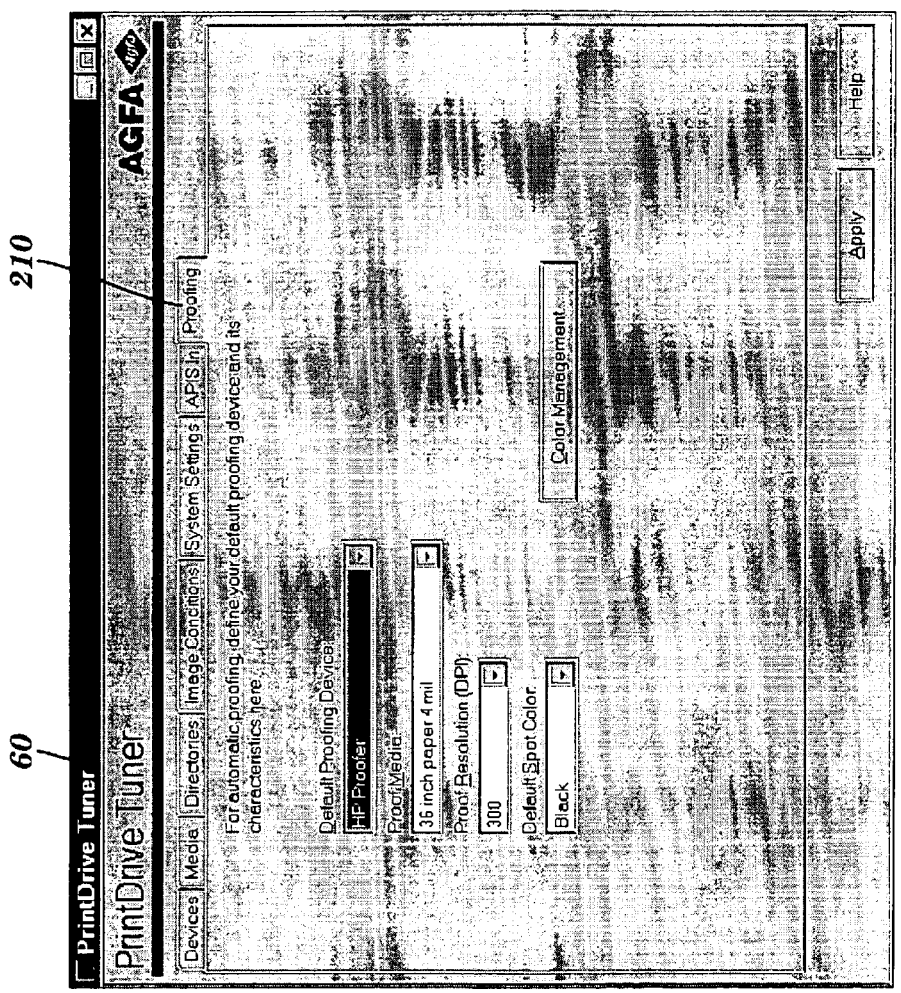
FIG. 13 illustrates the Proofing Tab of the Tuner Dialog Box of the present invention.
Figure 14:
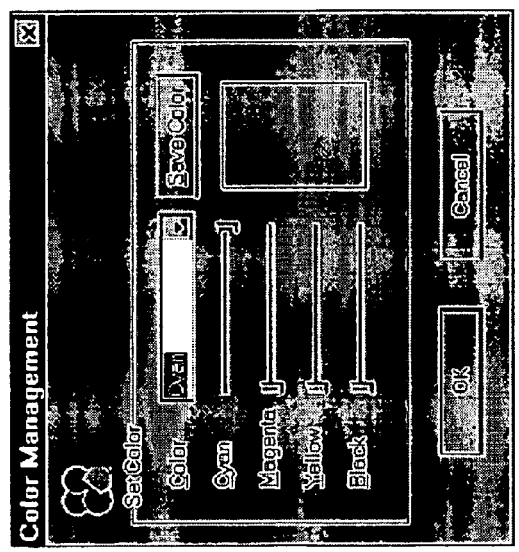
FIG. 14 illustrates a Color Management Settings Box of the present invention.

FIGS. 12–14 further show other views of the GUI for the present invention, for setting device properties, and proofing spot color management, respectively. With respect to FIG. 13, there can be a default setting for the ink setting when the default proofer does not have the ink as required for the job.

For electronic prepress systems of the present invention, the Pilot GUI may be located in a plurality of remotes platforms. With further reference to FIG. 2, for example, the Pilot GUI may be located on any RIP generally referenced by 41, on a remote PC/Macintosh platform 40 or 45, on the a server 42 as well as on the PrintDrive. Preferably the Tuner GUI is located on the PrintDrive(s). However, other embodiments of the present GUI may locate the Tuner at remote locations as well.

PPD Options

With PrintDrive, the user is no longer limited to a physically connected engine, and can therefore, define a single shop-specific PrintDrive PPD file that provides a means for specifying any possible device and media type that will potentially have output directed for it, whether it be a local or remote device. Some of the PPD options are derived from input provided by the user via the PrintDrive Tuner application. Once all configuration and setup information is specified (or changed) via the PrintDrive Tuner, the user will be prompted to generate a new PPD which reflects the current Tuner settings. A tool for automatic generation of the PPD may be provided with the PrintDrive present invention. This PrintDrive PPD is then loaded at the front-end and used for all PRINT operations.

Job-specific preferences are initially specified via PPD options. These parameters can then be modified, or new preferences can be specified via the PrintDrive Pilot Interface. The following table summarizes PPD options available in a PrintDrive configuration.

For electronic proofing systems employing a remote software MUX and where raster data is directly outputted to a digital proofer, the PPD's are provided by Postscript Software. For other embodiments which do not employ the PrintDrive, the PPD's are a set of static files with a separate PPD as specified by the user for each possible engine type that can be physically connected to the system.

TABLE 3 below summarizes the PPD options available for systems employing the PrintDrive of the present invention.

TABLE 3

PRINTDRIVE PPD OPTIONS

| PPD Options | Type | Override From PrintDrive Pilot |
|---|---|---|
| Engine: Media Name Selection | Dynamic list created via the PrintDrive Tuner application. | Via Job Properties Dialog. |
| Priority Level | Mutually exclusive choices are; High, Normal or Low priority. Default is Normal. | Via Job Properties Dialog. Urgent setting enabled via PrintDrive Pilot only. |
| Image When | Dynamic list created via the PrintDrive Tuner application. Three built-in choices are; Immediately, Hold or Preview. | Via Job Properties Dialog State of Image When condition set via System Preferences |
| | Preview indicates that the job will be held for Preview. Once approved from the Preview Client, user specifies subsequent Image When condition. Default is set to Immediately. | selectiom from the PrintDrive Pilot. |
| Post Imaging Option - Backup | Indicates whether Backup will happen after job Images. Default is no. | Via Job Properties Dialog. |
| Post Imaging Option - Delete | Indicates whether job is deleted after Imaging and/or Backup. Default is yes. | Via Job Properties Dialog. |
| Post Imaging Option - Notify after Print or on Error | User is notified after a job Images or error occurs. Notify method is defined via the PrintDrive Tuner Application. Default is no. | Via Job Properties Dialog. |
| Collation Sequence | Order that the separations are imaged when multiple copies selected. Default is ON (CMYK CMYK order) | Via Job Properties Dialog. |
| Proof (Manual Proof, Color Proof, Monochrome Proof) | Indicates that the job will be held for Proof. Once approved, user specifies desired Image When condition. | Via Job Properties Dialog, or when job is Approved |

Figure 15:
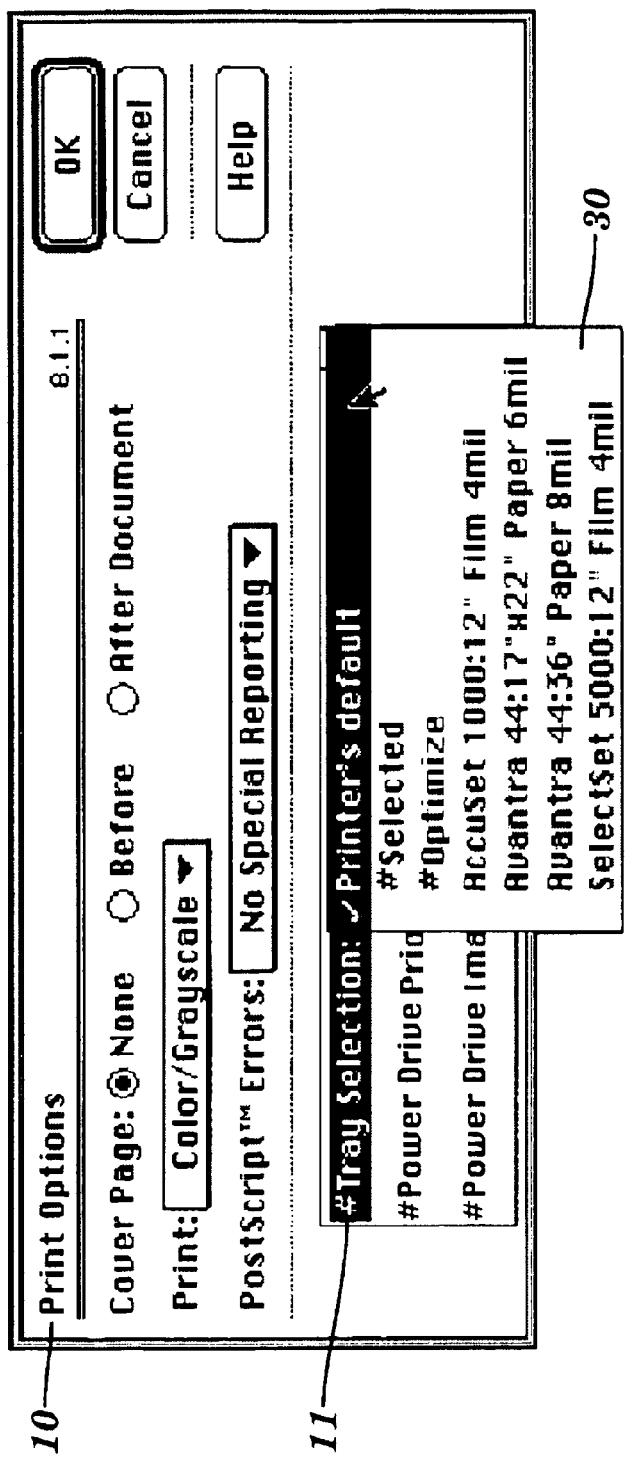
FIGS. 15–22 illustrate the PPD Options of the present invention.

FIG. 15 shows the Print Options dialog box 10 that is generated for the front end user after entering job data, i.e., at "PRINT" time. As described in the PrintDrive Tuner section, the PrintDrive operator defines a list of media names that get associated with a particular engine name. FIG. 15 shows how by selecting the "#Tray Selection:" option 11, the resulting strings which are a combination of engine name and media name, are presented in a drop down window 30. When a tray is selected, it indicates both engine type and media type required for the job. This information then flows along with the job so that the PrintDrive can both present this to the PrintDrive operator via the PrintDrive GUI, and use it when scanning the list of stored jobs to select the next imageable job.

Figure 16:
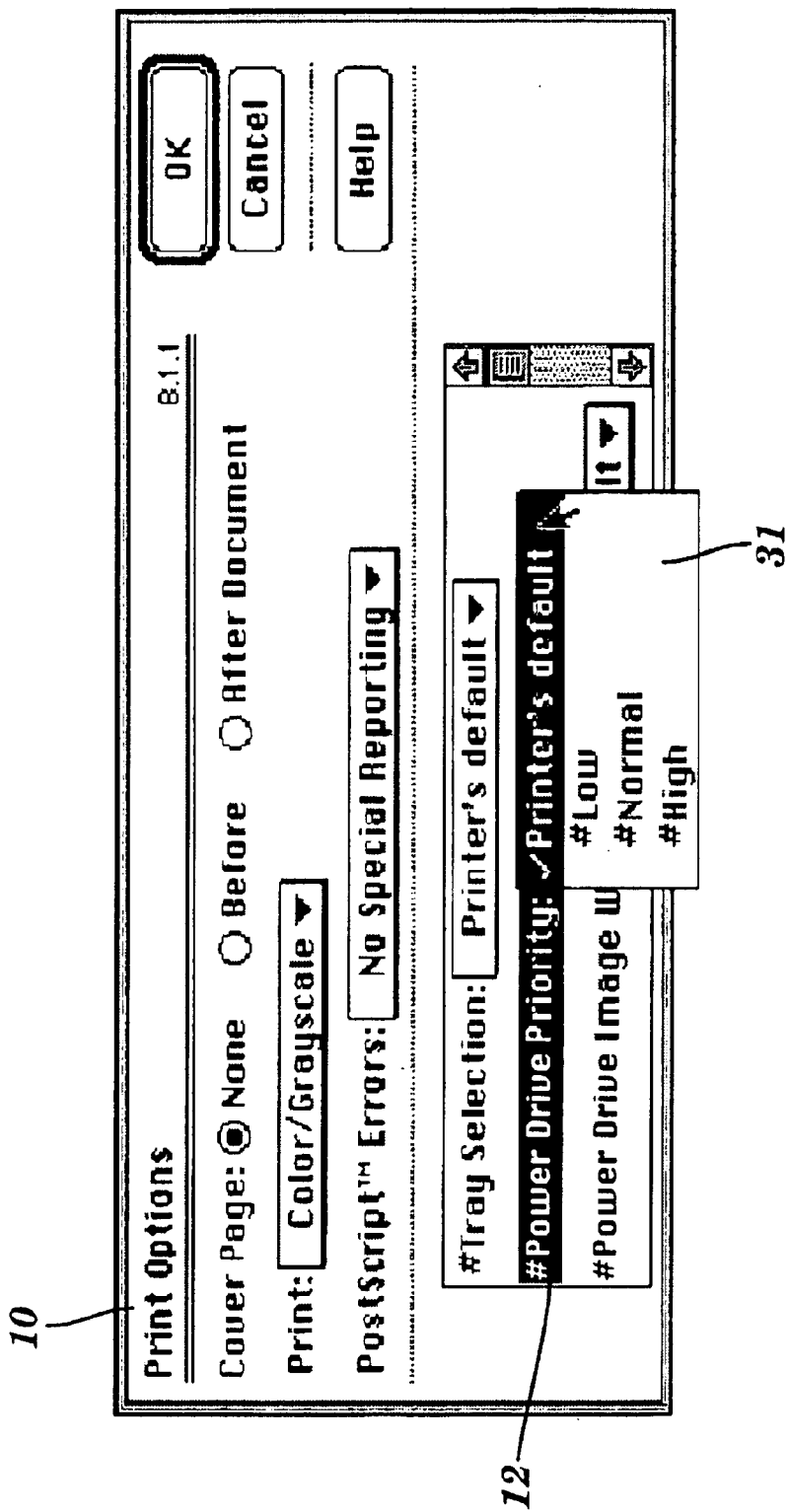

FIG. 16 shows how through the Print Options dialog box 10, the front end user can elect one of three priority levels. By selecting the "#PrintDrive Priority:" Selection option 12, the resulting priority options are presented in a drop down window 31. Through the PPD, the front end user can assign one of three priority levels to a job; high, normal, and low. For example, the priority levels could be defined as in TABLE 4 below.

TABLE 4

| PRIORITY | JOB IS NEEDED TO IMAGE |
|---|---|
| High priority | within a few hours. |
| Normal priority | within a day. |
| Low priority | within a few days |

The priority level is sent with the job information and the PrintDrive can present this to the user. This option defaults to normal priority.

An urgent priority can be assigned to a job when the user needs that job to image as soon as possible. However, the Urgent setting is only allowed via the PrintDrive Pilot, not via a PPD selection.

An Image When Condition can be selected via the PPD. This choice allows the user to specify the criteria that needs to be satisfied before a job is allowed to image. As described in the PrintDrive Tuner section, these conditions are defined using the PrintDrive Tuner Application.

Figure 17:
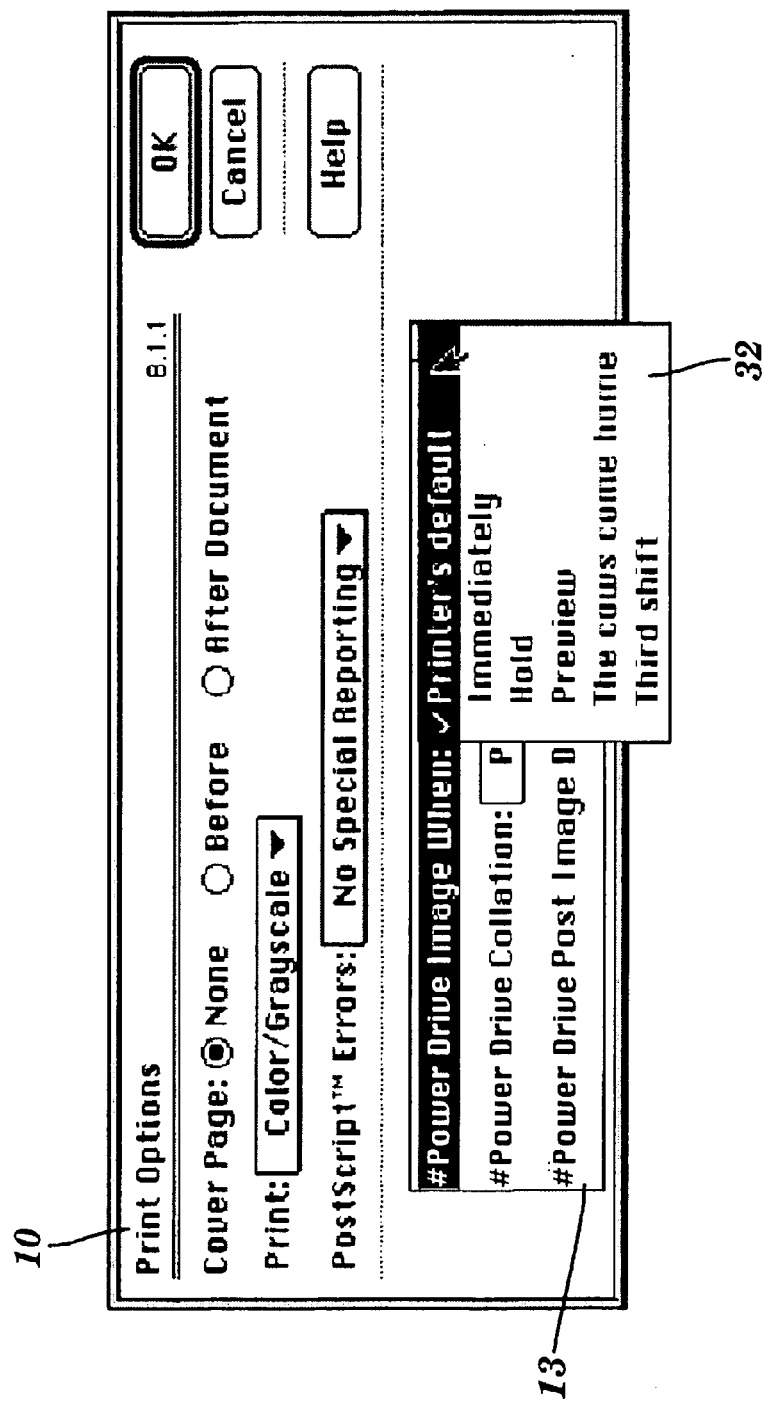

FIG. 17 shows how through the Print Options dialog box 10, the front end user can elect Image When Conditions. By selecting the "#PrintDrive Image When:" Selection option 13, the resulting priority options are presented in a drop down window 32. Through this PPD option, the front end user can select from at least six built-in choices available: Immediately, Hold, Preview, Manual Proof, Color Proof and Monochrome Proof As described in the PrintDrive Tuner section, Immediately implies that there is no user defined condition that must be satisfied. The job images as soon as it meets all output criteria and it becomes its turn to image. Hold, on the other hand, implies that the job needs operator intervention to be made available for imaging. For example, as shown above, a possible Image When condition would be "Third Shift." Through the PrintDrive Pilot (described later), the user has a means for indicating that "Third Shift" has occurred. When this happens, the PrintDrive software will enable all jobs on hold for "Third Shift" to image (assuming correct engine/media is loaded).

Preview indicates that the job needs to be Approved from the Preview Application before being eligible for output. Upon Approval, the user will have the ability to specify a subsequent Image When condition, or image Immediately.

All user defined conditions specify a "Conditional Hold", that is, the user defined condition that must be satisfied before the job is allowed to image. This provides the user with a way to set up an unattended session of jobs to image. The Image When condition is sent with the job information and the PrintDrive can present this to the user. The default setting is Immediately.

Figure 18:
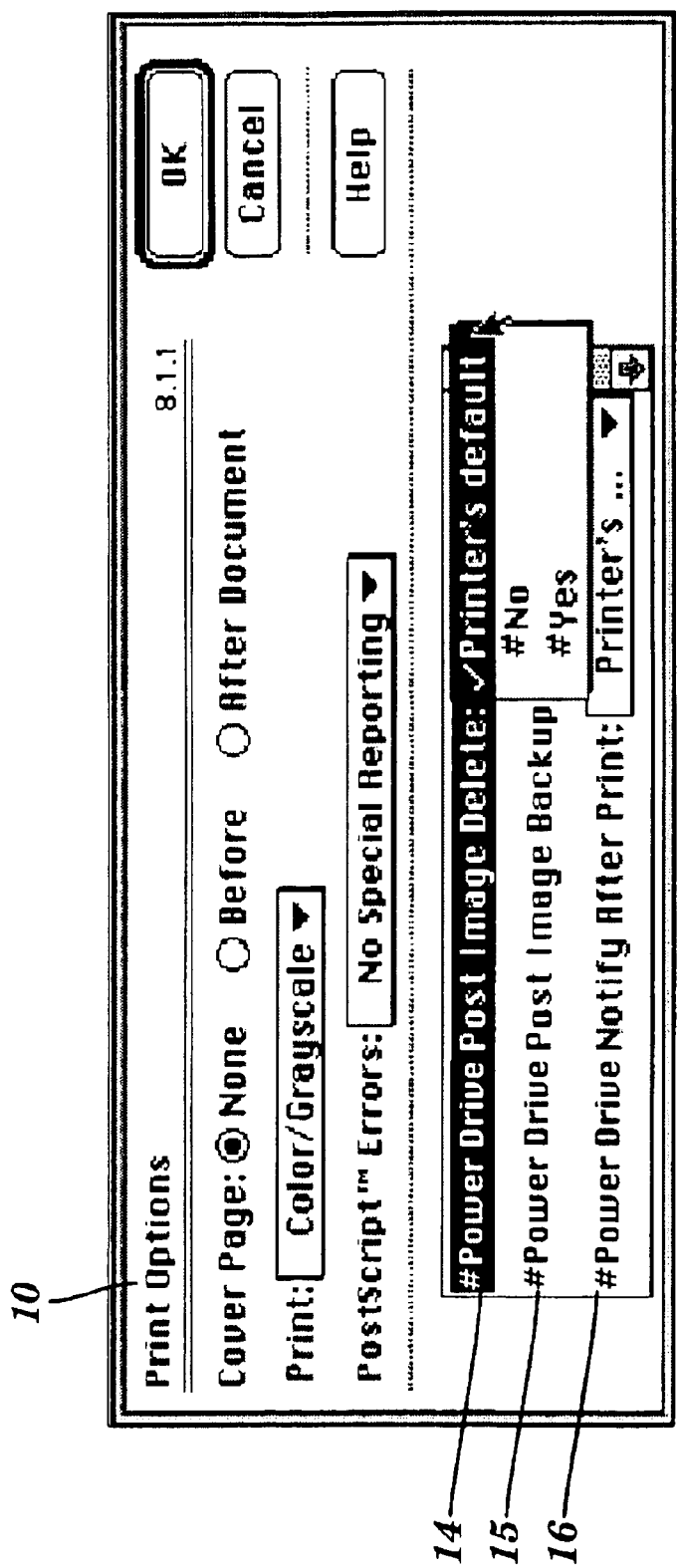

FIG. 18 shows how there are three Post Imaging options which can be specified through a PPD option: Delete 14, Backup 15, and Notify 16. These options take affect after a job has imaged successfully. These are not mutually exclusive, that is, the operator can specify all or none of these options per job. Backup specifies that the job is to be backed up after it successfully images to the location specified in the PrintDrive Tuner Application. The backup operation is invoked manually from the PrintDrive Pilot.

Delete specifies that the job is to be deleted after imaging and/or backing up. A File Deletion Time Preference can be set at the PrintDrive Tuner to apply a delay to the actual deletion taking affect. If Delete is not specified, the job will remain in the job list with a Hold condition.

The PrintDrive system defaults are "No Backup," "Delete After Imaging" (no delay), and "No Notification."

Notify specifies that the user wants a notification after a job successfully images. The notification method is specified in the PrintDrive Tuner Application where the choices are None, Originator, Administrator, or All.

When multiple copies are specified, the order that the separations are imaged is determined by the Collation sequence specified in the PPD. A RIP queries a device via the Device API to find out the device's characteristics, in this case the device is the PrintDrive. The Number of Copies field is sent back as an optional device parameter in the Device API when this function is supported by the device.

The PrintDrive always sends back that Number of Copies is supported. This allows the Number of Copies specified to the Printer Driver to be passed along with the job to the PrintDrive, and the specified value is used to output that many copies of the job. The default setting is 1 copy. The PrintDrive operator, if it is desired, can later override this setting via the PrintDrive Pilot.

Devices that do not support this function do not include this as an optional parameter in the Device API. This indicates that the Number of Copies in the print dialogue refers to its traditional meaning, that is rendering the job multiple times.

Figure 19:
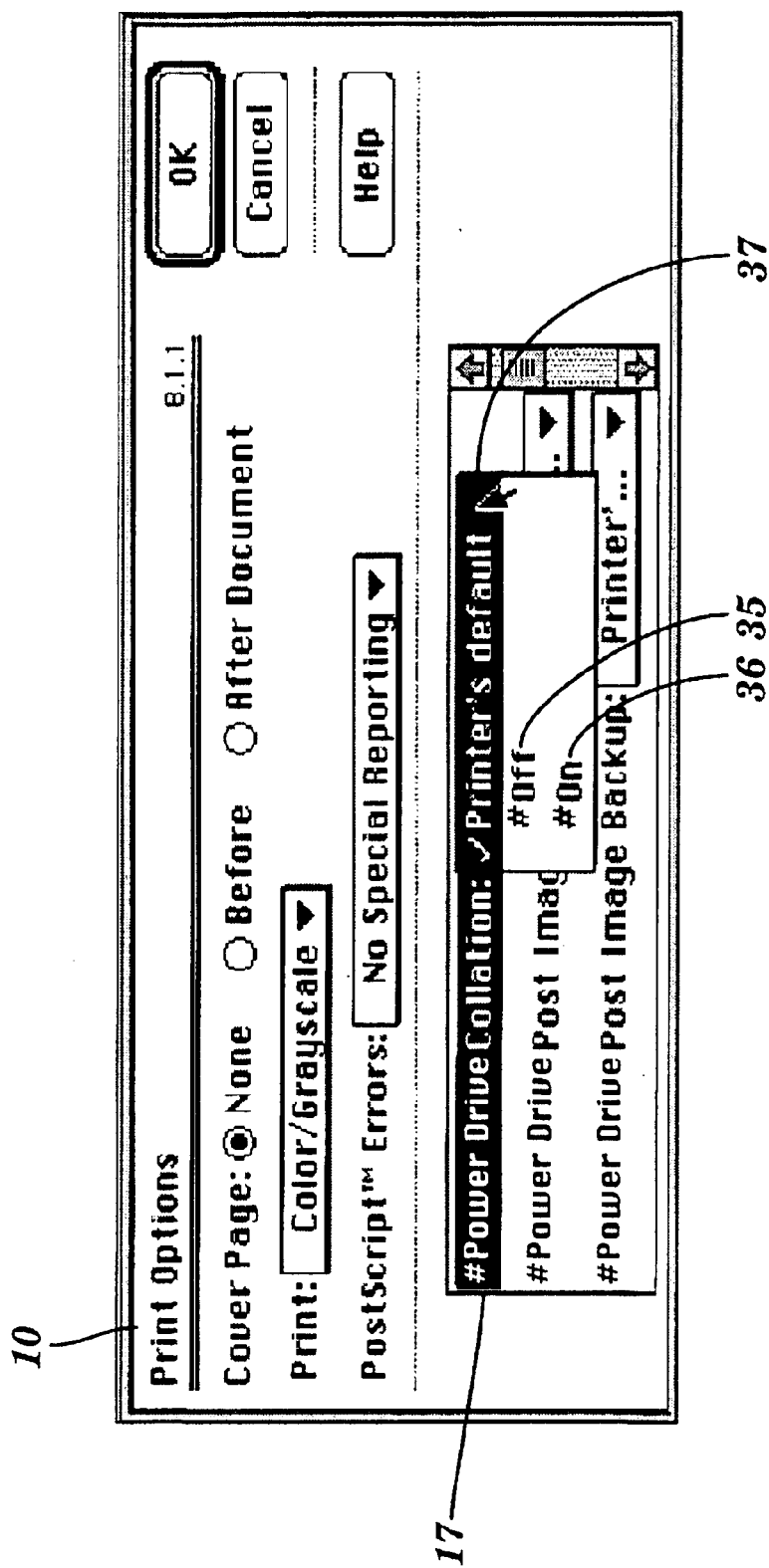

FIG. 19 shows how through the Print Options dialog box 10, the front end user can choose one of two sequences to be applied when multiple copies of a job are specified from the PPD by selecting the "#PrintDrive Collation:" Selection option 17. (This setting can be overridden by the PrintDrive Pilot.) By selecting collation "on" 35, a multiple copy job can be imaged completely before going to the next copy. For example, a 1 page job of 4 planes with 2 copies would image as CMYK CMYK. In the alternative, by selecting collation "OFF" 36, each plane can be imaged multiple times before going to the next plane. For example, the same 1 page job of 4 planes with 2 copies would image as CC MM YY KK.

The default choice 37 is ON, to image a complete job before going to the next copy.

PPD Generation

The PPD Generator is a set of PostScript files which, when downloaded to a RIP, generates a new printer description file based on settings retrieved from a connected PrintDrive. PPD generation is a process by which an operator can automatically build a new PrintDrive printer description file.

Figure 20:
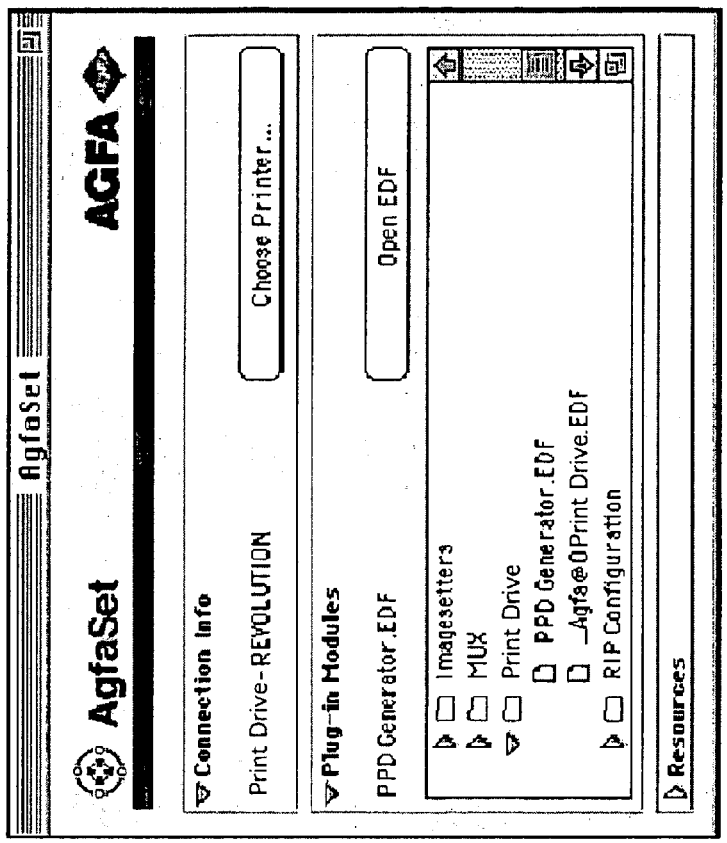

FIG. 20 shows how his file will contain all standard Agfa print options as well as PrintDrive specific options.

Figure 21:
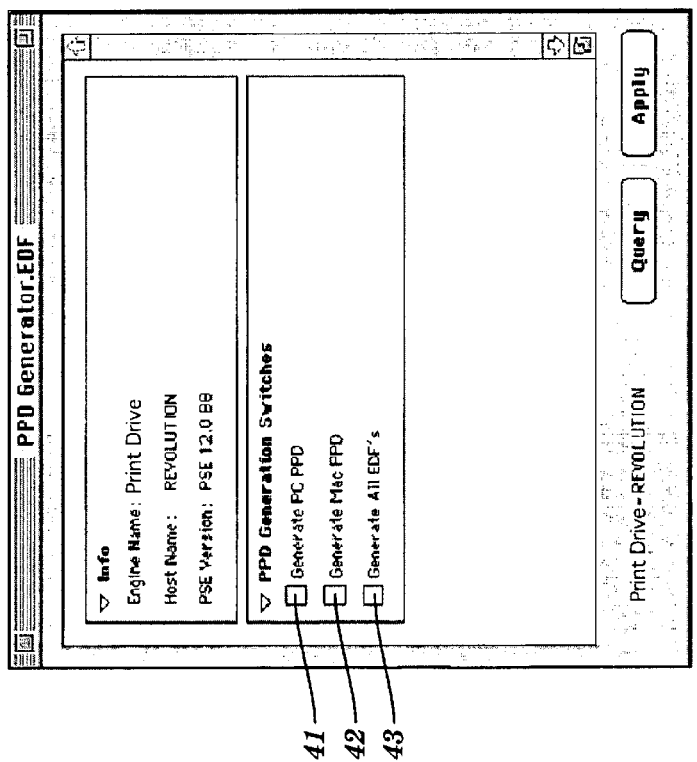

FIG. 21 shows how by selecting the PrintDrive folder from the Agfaset PPD generator, there are three choices: Generate a PrintDrive 41, PPD in PC format, Generate a PrintDrive PPD in MAC format 42, or, Generate all EDF files 43 which includes all of the PrintDrive specific Engine Description Files, (EDF's).

The PPD and EDF files generated by this process are stored on the RIP which is connected to the PrintDrive. The operator can then move these files to his front-end machine (MAC or PC) either manually or via a network. A separate PrintDrive PPD is generated for each language supported by the PrintDrive product. These are stored in their respective language folders on the RIP in the PSE area.

A PrintDrive operator needs to use the PPD Generator to build a new PrintDrive PPD whenever various PrintDrive Tuner changes are made, such as, when an engine and/or are defined or removed; when media is assigned or removed to/from an engine; or, when an image when condition is defined or removed.

The new definitions appear in the PrintDrive specific print option choices at the operator's front-end. New EDF's are required whenever a new print option is developed.

TABLE 5 summarizes the steps necessary to generate a PrintDrive Postscript Printer Data, (PPD), Files and Engine Data Files, (EDF), using the PrintDrive and RIP software of the present invention.

TABLE 5

1. Start up the PrintDrive Services on the PrintDrive machine via the PrintDrive Pilot.
2. Start up the RIP Application
3. Start up the RIP Application if available.

TABLE 5-continued

4. Using a PostScript downloader, download the PPD Generation files.
    a) This can be done locally at the RIP machine through some RIP Pilots, for example, using Send Files from a Taipan RIP.
    b) If this is not possible, transfer the downloadable PostScript files to the front-end machine and download the files through any available PostScript downloader, such as AgfaSet, LaserTalk, PSTool, etc.
5. Download the PPD ProcSet file.
6. Download the PrintDrive ProcSet file.
7. Download the Message Banks file.
8. Download the PrintDrive Message Banks file.
9. Restart the RIP.
10. Transfer the PPD Generator.EDF file to the front-end system connected to the RIP. This can be done manually or through a network.
11. Install and Start up the AgfaSet Application on the front-end system.
12. Through AgfaSet, open the PPD Generator.EDF file and the following choices are displayed;
    a) Generate a PrintDrive PPD in PC format.
    b) Generate a PrintDrive PPD in MAC format.
    c) Generate all EDF's.
13. Select any combination and click Apply. This will generate the PPD's and/or EDF's specified. The PPD's, one per language, are stored on the RIP under the language name in the RIP/PSE folder. The EDF's are stored under the RIP/PSE folder.
14. The operator can then either manually or through a network move the PPD's and/or EDF's to the front-end machine. 5.5 USING After generating the PrintDrive PPD and EDF files, they can be used to customize and select your printer options. The operator at the front-end must select the RIP device before making use of either the EDF's or PPD's.

Figure 22:
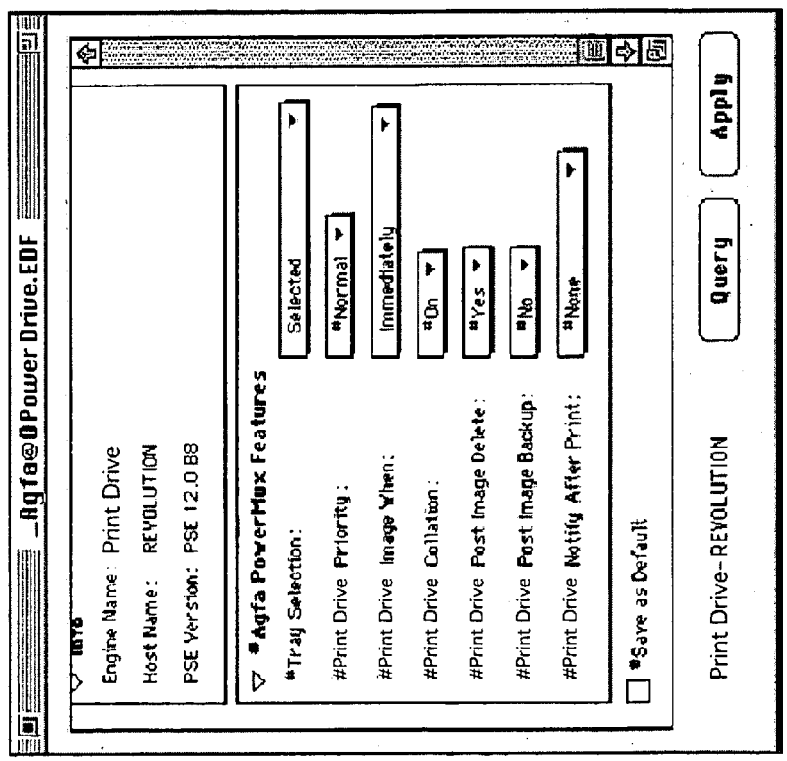

The PrintDrive EDF file contains the PrintDrive specific print options and their defaults. The default setting of an option at the RIP at print time is referred to as the Printer Default. FIG. 22 shows how the defaults for a particular RIP can be customized and saved through the PrintDrive EDF. Once saved as the default, the EDF selections are persistent, that is they become the Printer Default at the RIP. The customization of the Printer Defaults is optional, but can help the operator who always prints jobs with a particular default set of options.

The PrintDrive PPD file is used strictly at print time. The PPD selections are available from the Print Options Dialog and they are made on a per job basis. A Printer Default selection is available for each PPD option. When an operator chooses a Printer Default, no PostScript is generated to include that option with the job. Instead the default setting at the RIP is used. Any selection other than Printer Default for any PPD option generates the PostScript to set that value at the RIP and that value is sent with the job.

A connection must be established for each RIP that is to be connected to the PrintDrive. Once the PrintDrive components have been installed on the RIP, the user must then configure that RIP to connect to the PrintDrive.

Figure 23:
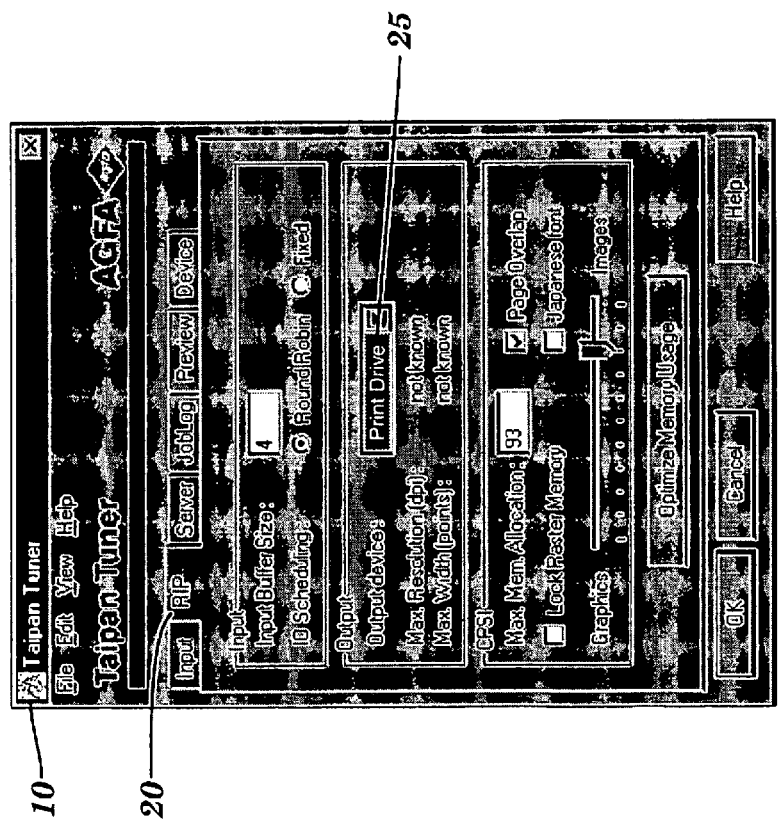
FIGS. 23–26 illustrate various dialog boxes of the present invention.

FIG. 23 shows a graphical user interface entitled Taipan™ Tuner 10 which is a typical software RIP for the system of the present invention. From the RIP tab 20 of the Taipan™ Tuner 10, the RIP software user must select the PrintDrive 25 as the desired output device, as shown.

Figure 24:
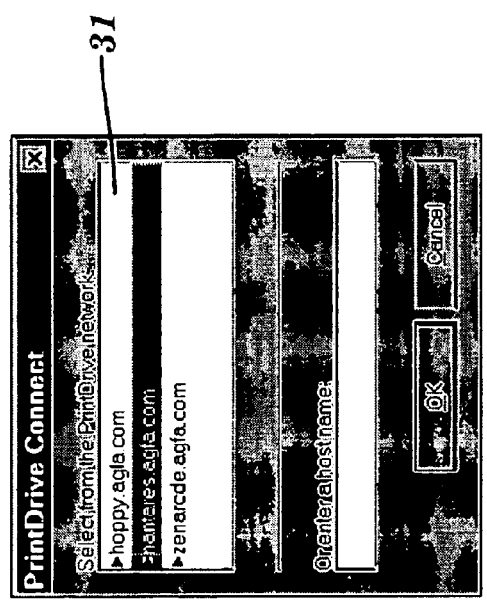

With partial reference to FIG. 3, FIG. 24 shows how from the Pilot user must enter in the host name of the PrintDrive 41 system. In this example, three device names are shown as being referenced by the names of "hoppy," "nantares" and "zenarcde" within the PrintDrive Host window 31. (It is noted that FIG. 3 only shows two of the three PrintDrives depicted in FIG. 24.) To connect to a designated PrintDrive, say one the PrintDrives 41 in FIG. 3, the Pilot user has selected nantares as indicated by the darkshading in FIG. 24.

Figure 25:
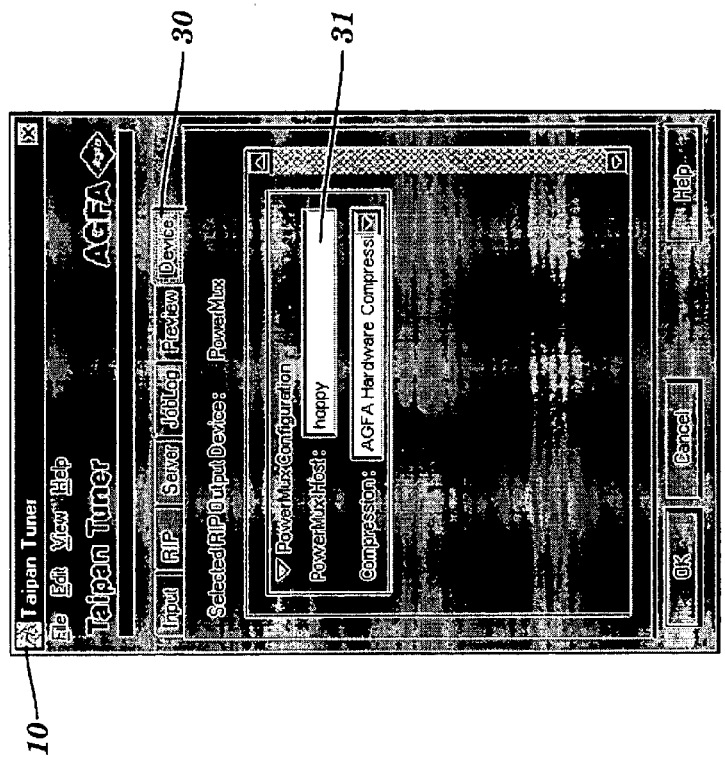
Figure 26A:
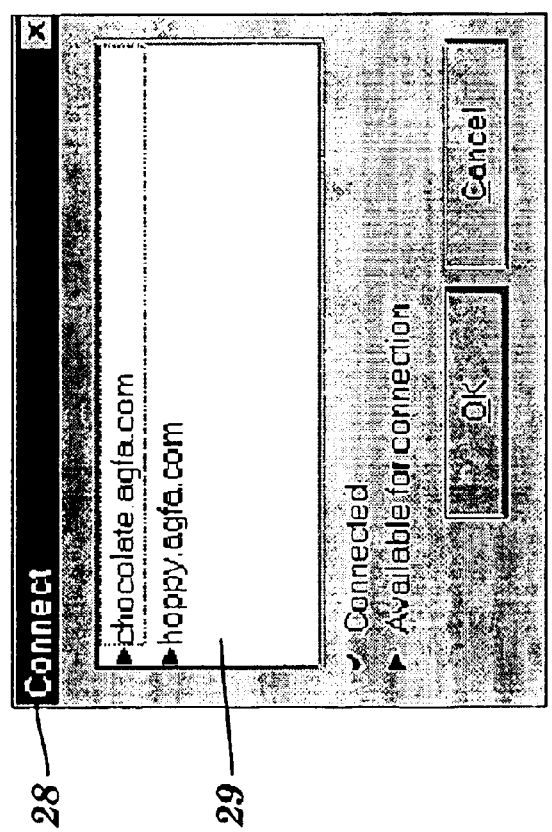
Figure 26B:
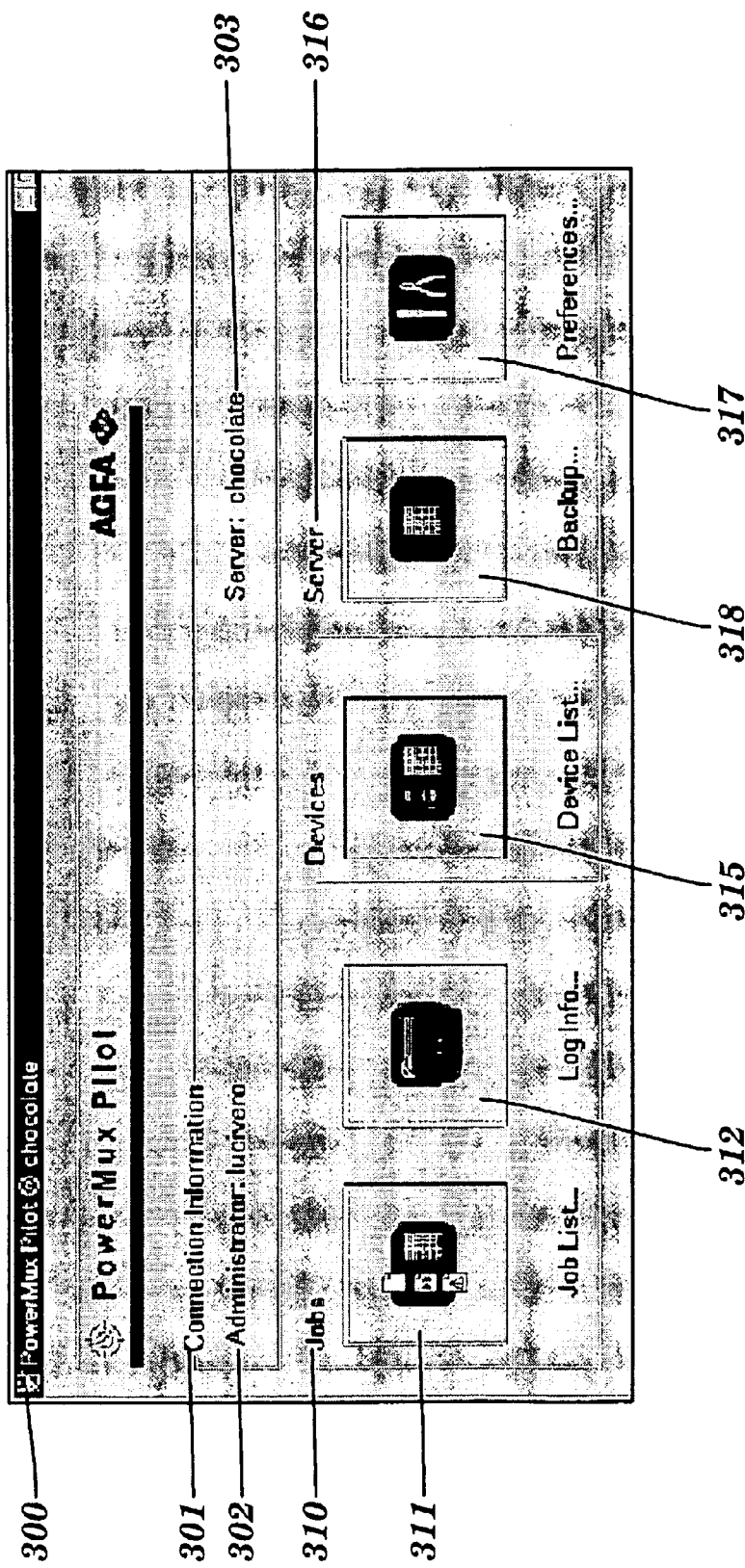
Figure 26C:
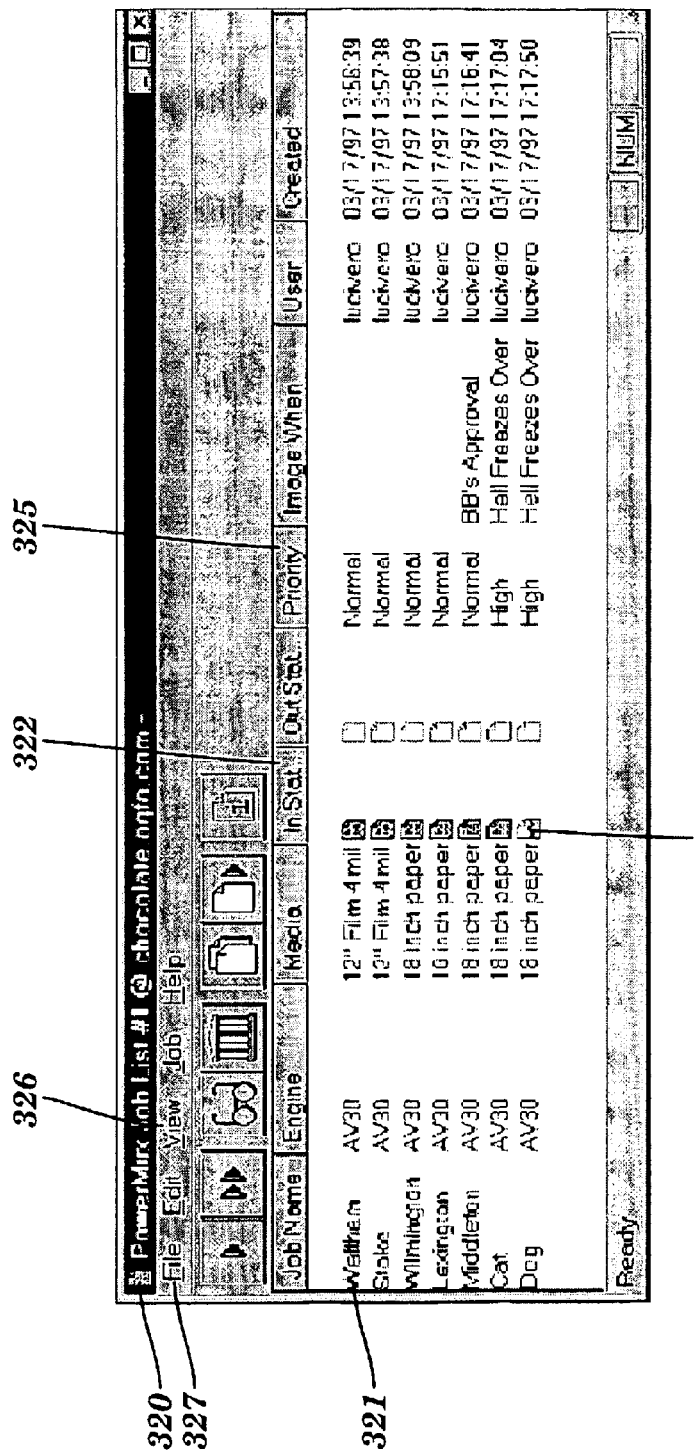
Figure 26D:
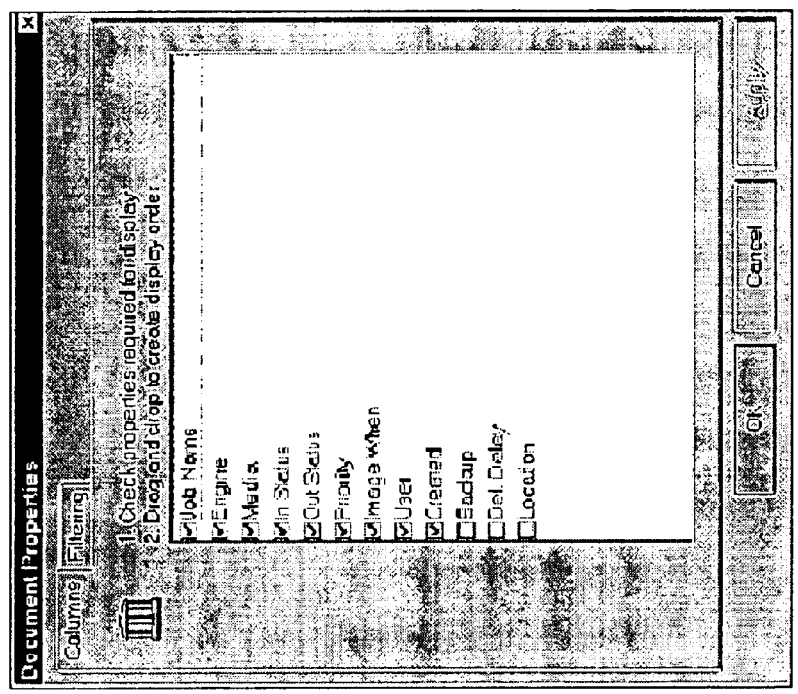
Figure 26E:
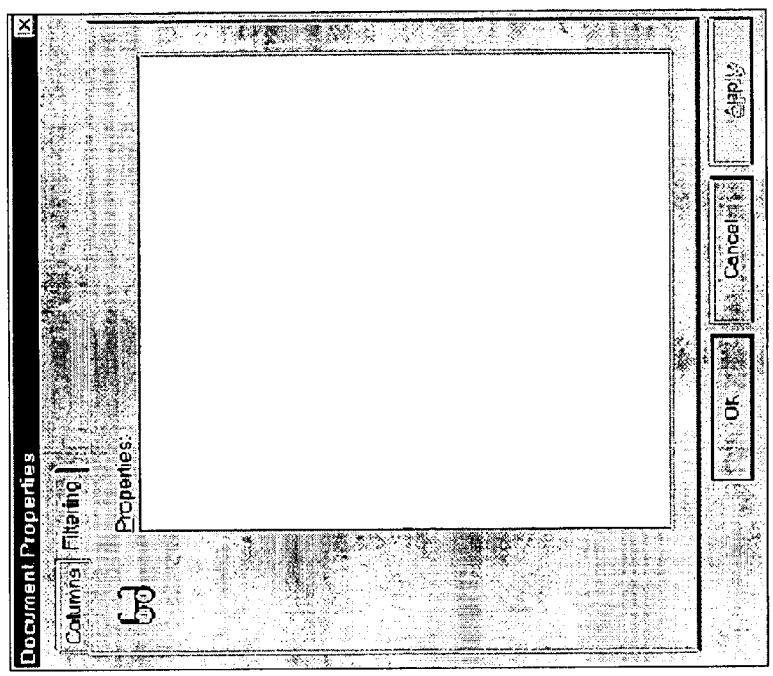
Figure 26F:
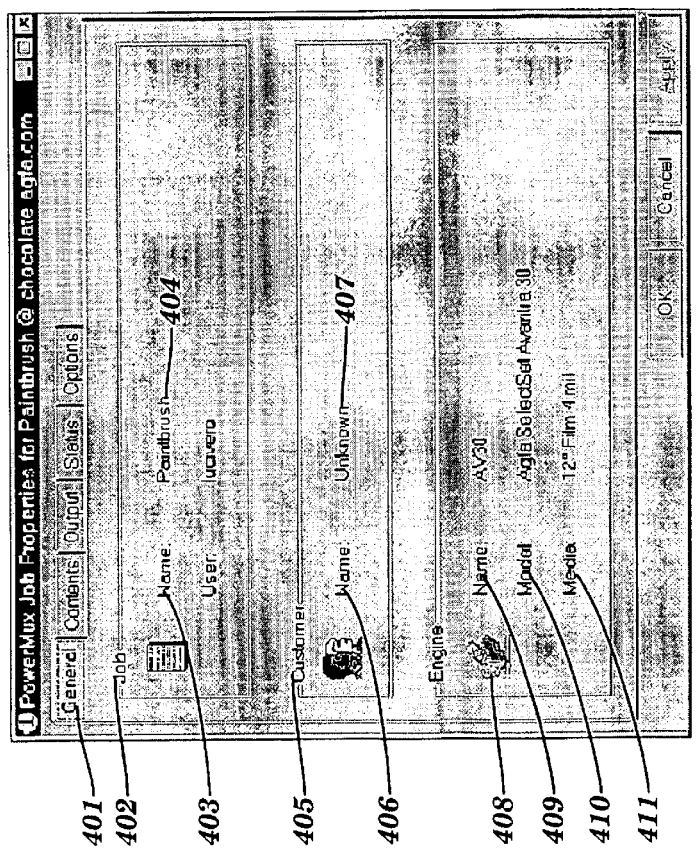
Figure 26G:
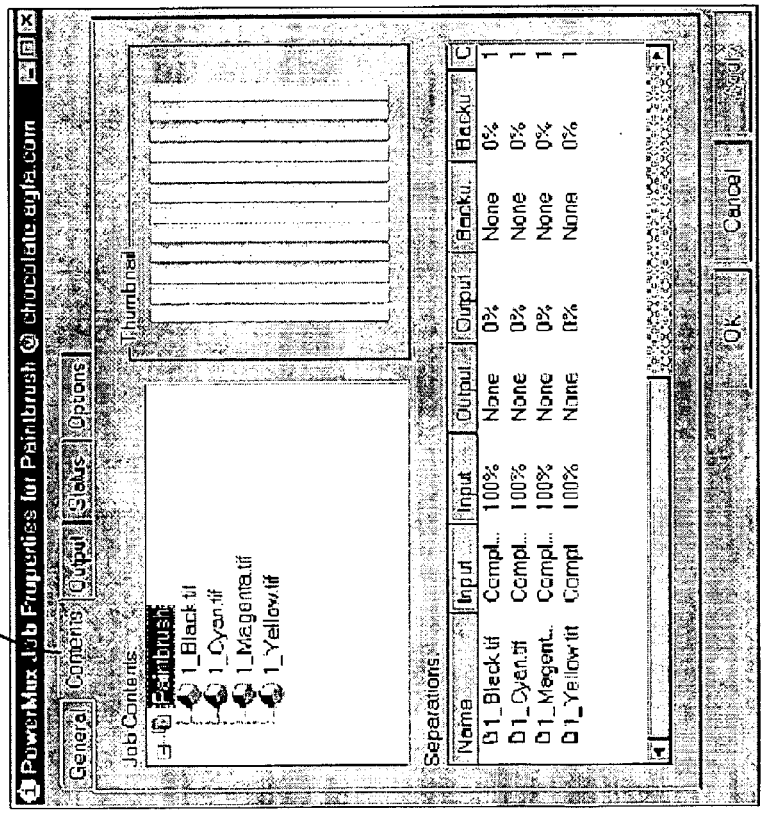
Figure 26H:
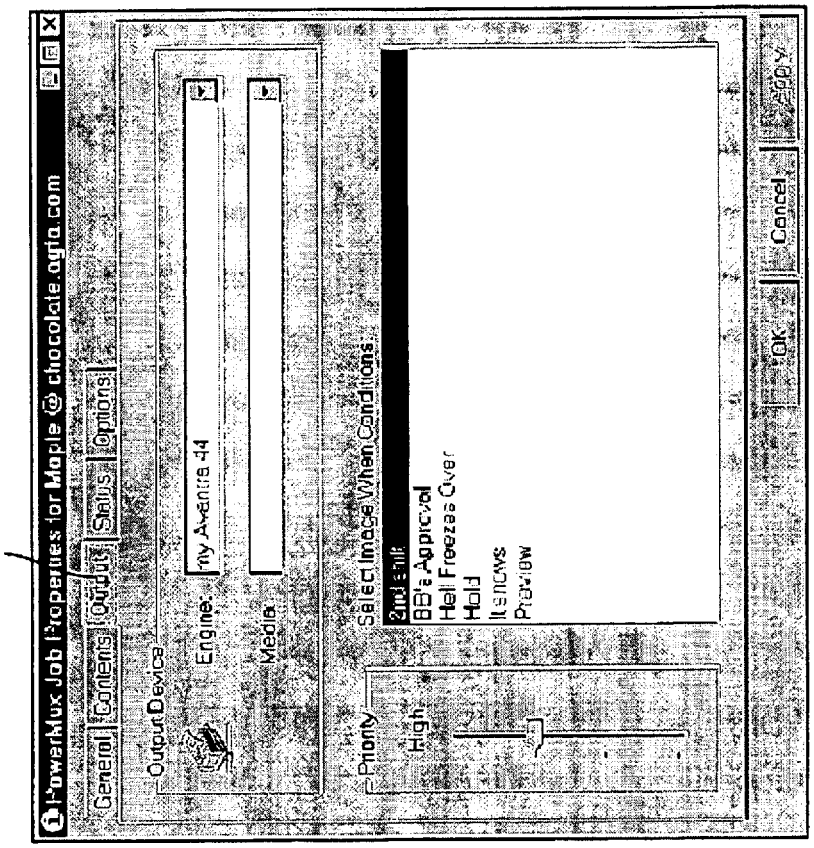
Figure 26J:
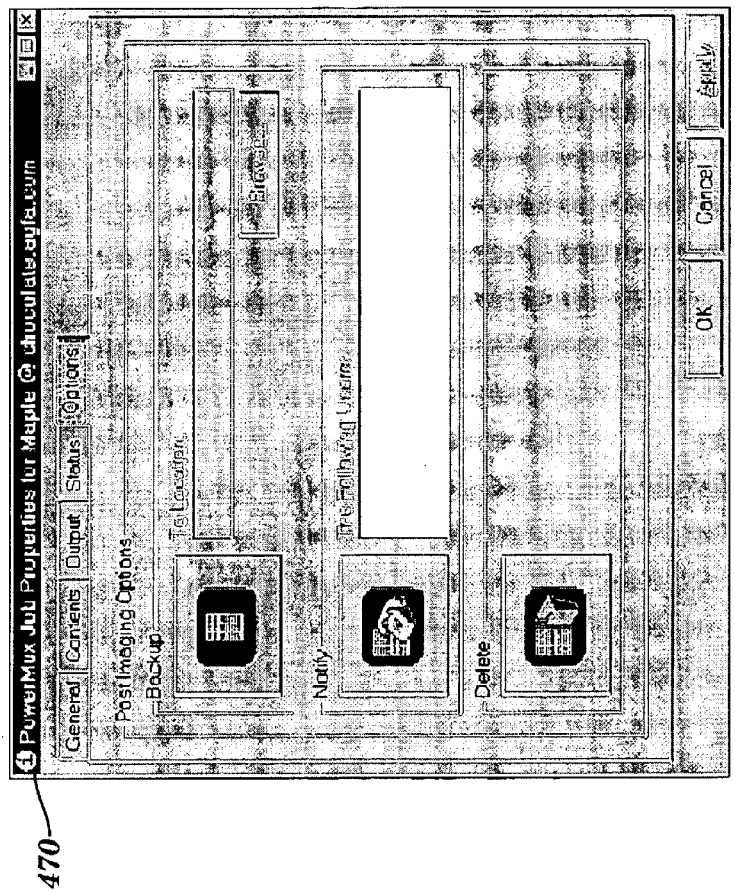
Figure 26K:
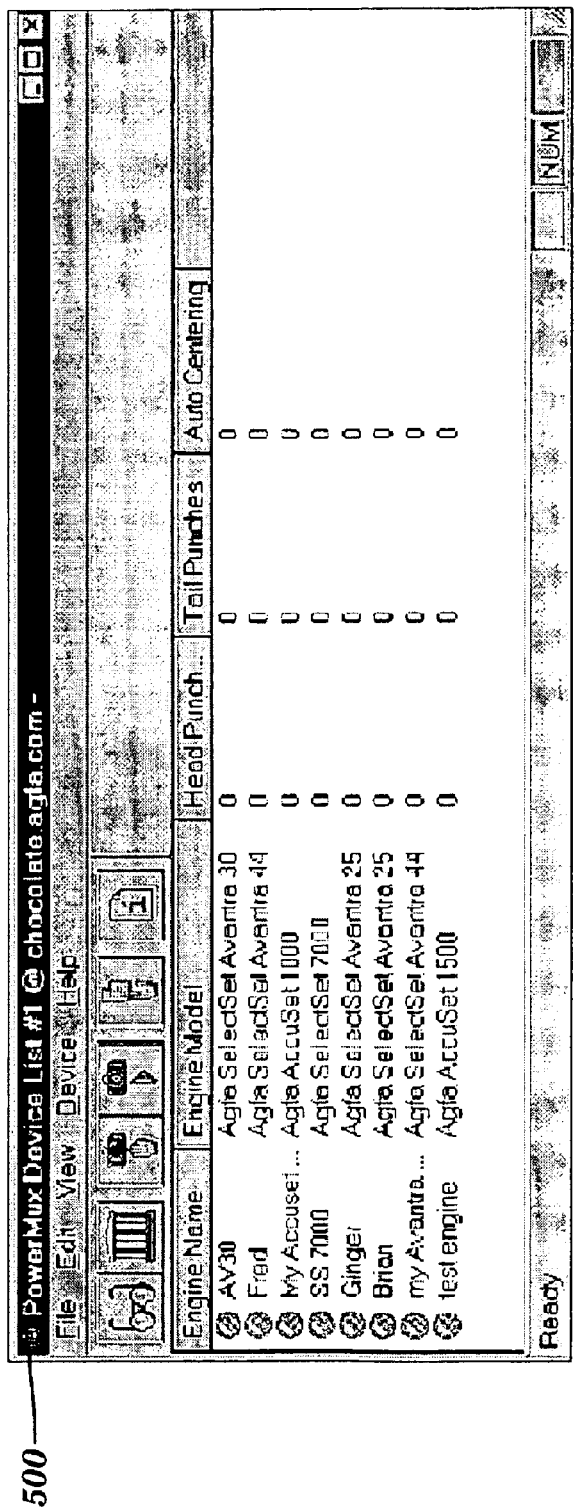
Figure 26L:
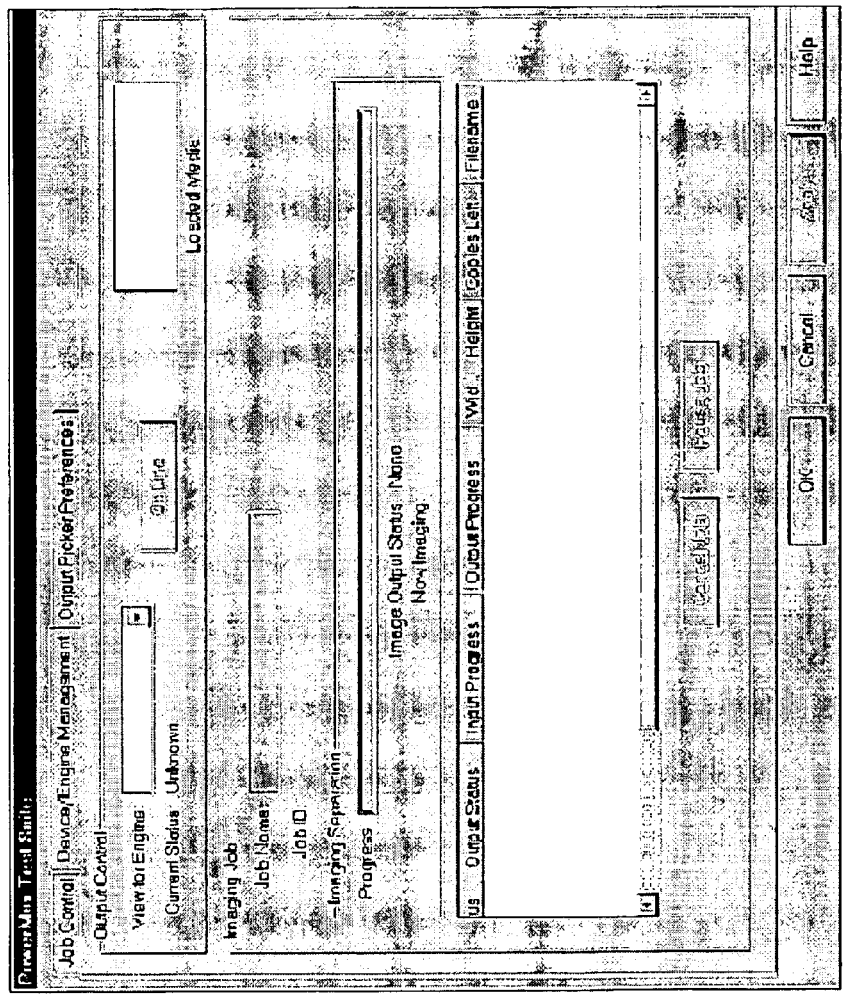
Figure 26M:
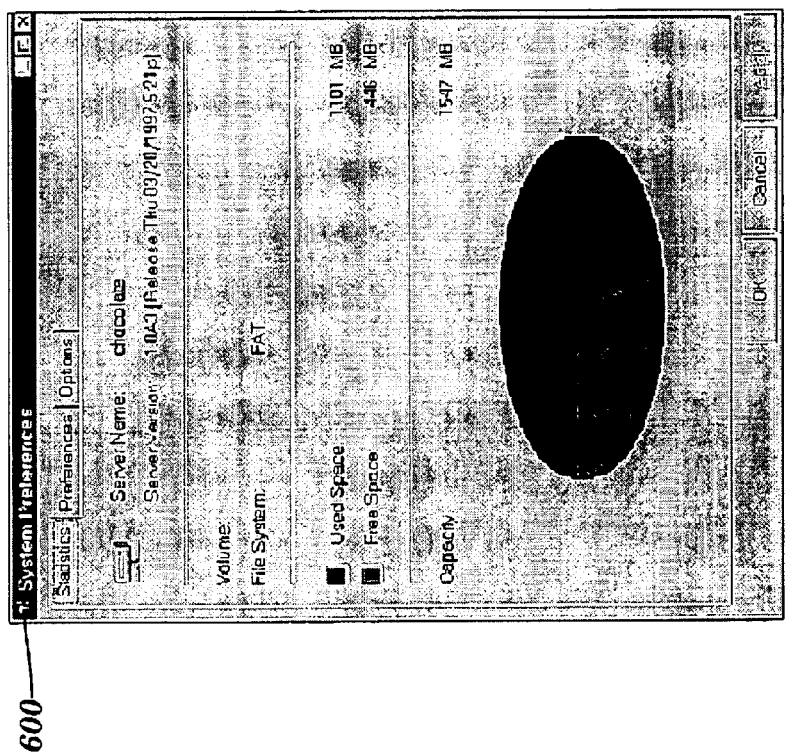
Figure 26N:
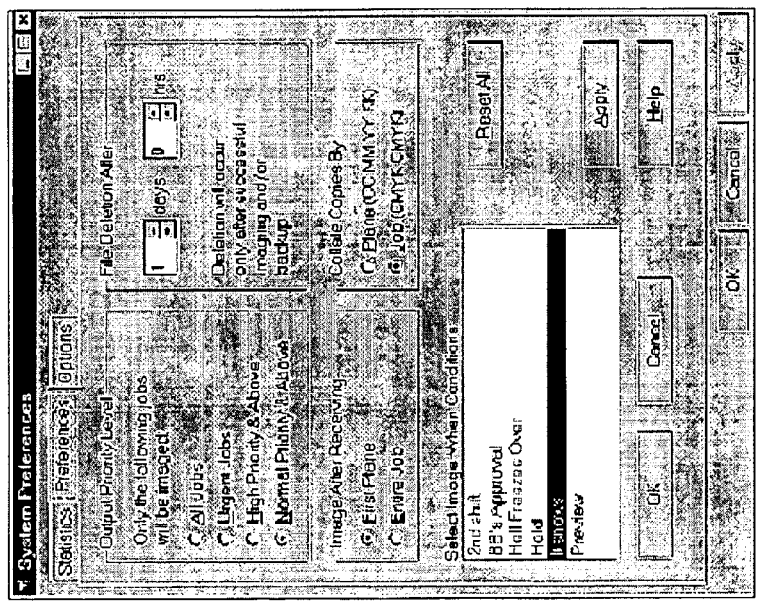

FIG. 25 is an example of another dialog box showing additional options for connecting a software RIP to a PrintDrive of the present invention.

Printdrive Pilot User Interface

FIG. 26 also shows how upon initial start-up of the PrintDrive Pilot software, another example of a dialog that is presented to the user, a Server Connection box 28 which prompts for connection to the desired Server. A locate mechanism is provided to list all the PrintDrive Servers that are resident on the network. The user may then select the desired server from the list provided, or type in a host name. For example, FIG. 26 shows how the server entitled chocolate.agfa.com 29 has been selected. Once selected, this information may remain persistent, meaning that Server selection need only be done once if that server remains on the network. Upon restart, if that server is no longer present on the network, the user will be prompted again with this dialog.

As known in the art other pseudonyms for PrintDrive exist such as PowerMux. It will be readily understood by these skilled in the art that every occurrence of the term "PowerMux" in the figures can be taken to mean PowerDrive.

Figure 27:
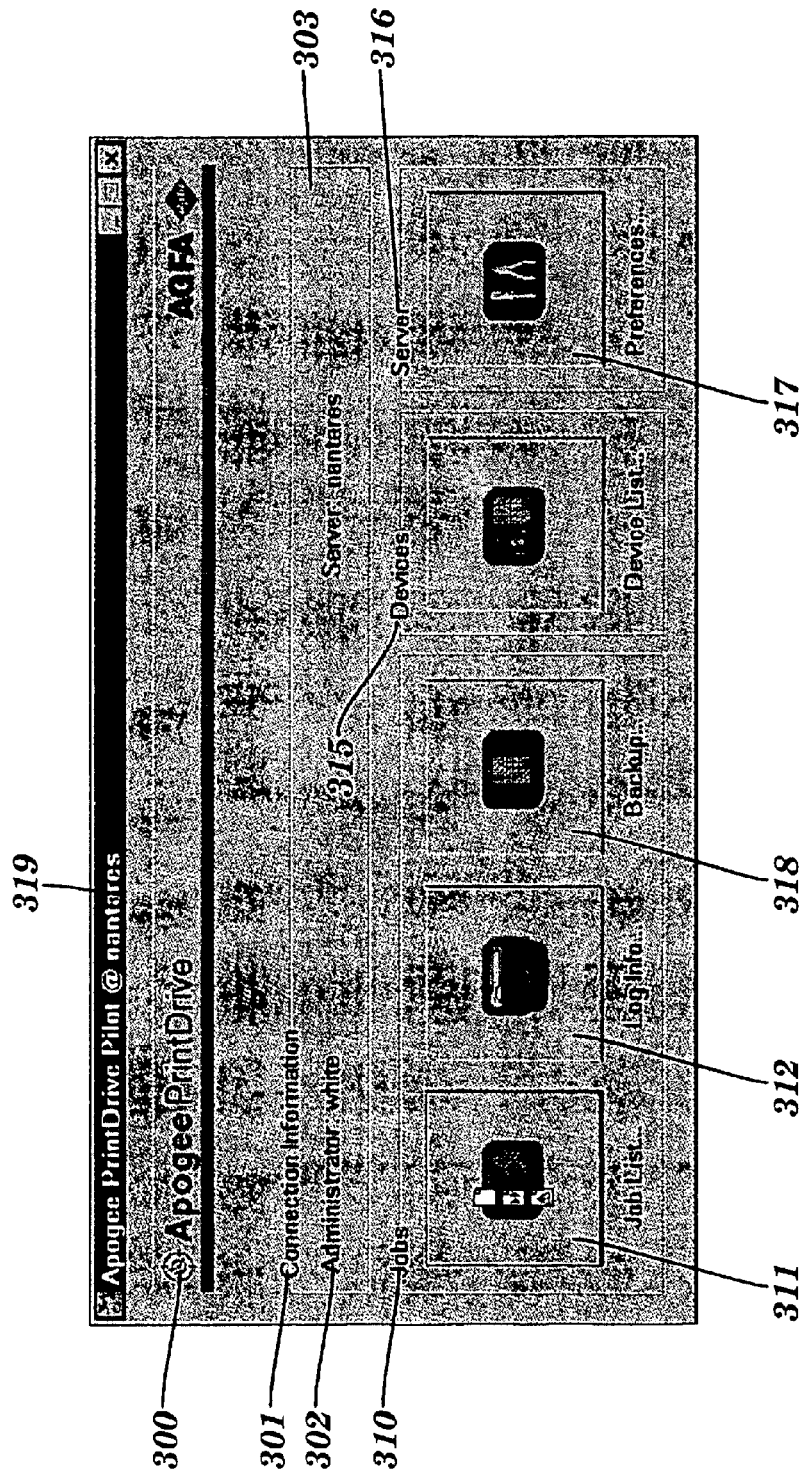

FIG. 27 shows how after a server connection is made, the PrintDrive Pilot main window 300 appears. The PrintDrive Pilot main window is divided into four panels. The Connection Information panel 301 displays the name of the administrator 302, and the name of the server 303 to which the administrator is connected. In the Jobs panel 310, two options are available. The Job List option 311 allows for viewing and administration of all jobs that are queued up at the PrintDrive. The Log Info option 312 allows checking of all processing that occurred at the PrintDrive.

With further reference to FIG. 27, the Devices option 315 provides all necessary information pertaining to the output device(s) connected to the PrintDrive. While the Server panel 316 allows control over backup of jobs to external media via the Backup option 317, as well as, allowing a means for viewing and controlling system wide information via the Preferences option 318.

Figure 28:
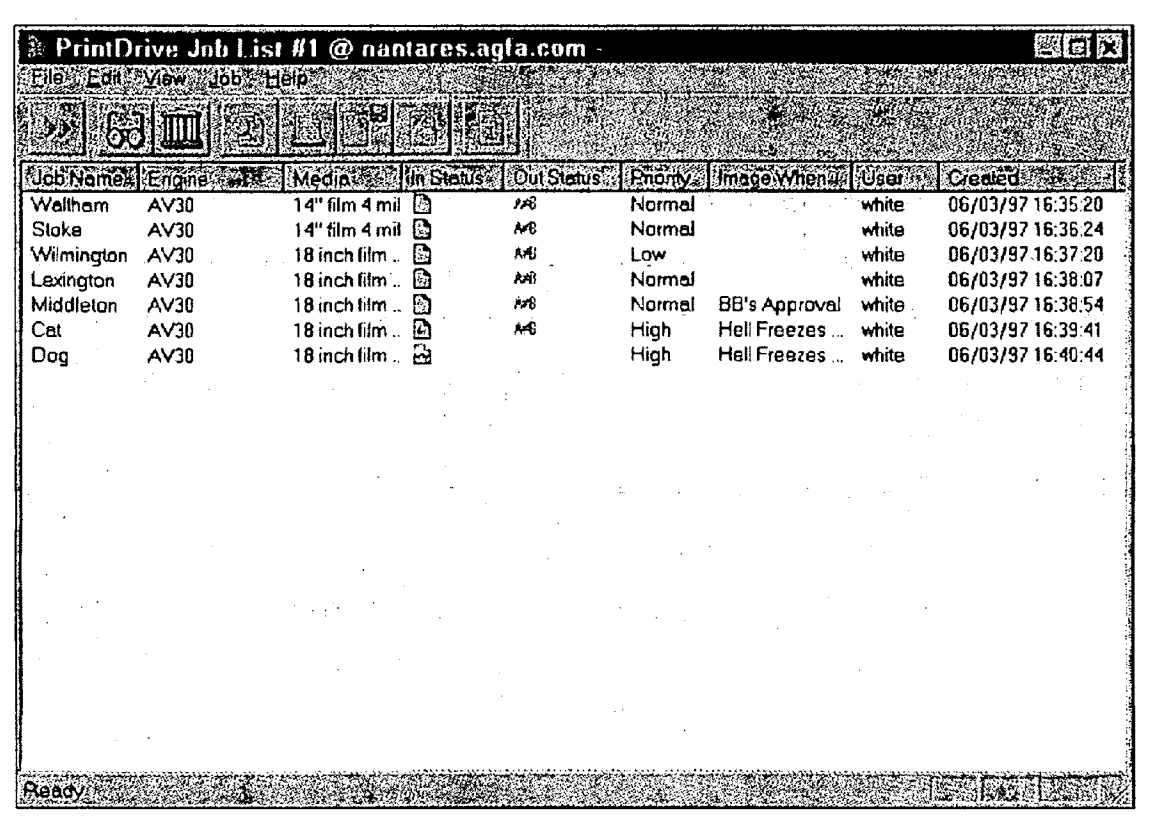

FIG. 28 shows a sample Job List dialog box 320 which displays a typical job list for the system of the present invention. In general, there is one Job List per PrintDrive system. When a job begins to input from a RIP that is connected to the PrintDrive, a Job List entry 321 is created. While the job is being received by the PrintDrive, the Input status icon 322 shows Spooling, as for example, indicated reference numeral 323 by the "half page" icon for the job named "Dog." Once the job has been fully received, it's input status is changed to Complete as for example indicated by the "full page" icon for the job named "Waltham."

Any non-imaging job may be deleted from the Job List. This operation deletes the Job List entry and associated disk data for the job. The currently imaging job is not allowed to be deleted. Instead the operator must Cancel the job first, and then can decide to delete the job or retry imaging at a later time. A confirmation dialog will be displayed to verify that the operator really wants to delete the selected job(s).

Through the Pilot User Interface, there is more than one way of canceling a job. FIGS. 27–36 show how via the Device List button 315 of the Main Pilot window and then from the Cancel Icon 499 in the device List Dialog Box 500, a cancel command can be applied to the currently spooling job (inputting from the RIP). Although input will stop, the currently received planes from that job will remain stored on the PrintDrive. The user must then manually delete them if desired.

With further reference to FIG. 28, from the Job List, the user may "quick start" a job by assigning an Urgent Priority to the job under the Priority icon 325. This action will have the effect of removing any "hold" conditions associated with the job, and attempting to make it the next imageable job if it is compatible with the currently connected engine and the currently loaded media. If it is not compatible, a notification message will be posted.

A preview of job can be launched from the Preview application by clicking the Preview tool button 326 from the top level Job List 327, or from the "Contents" tab of the Job Properties dialog (see FIG. 32 and discussion below). Similarly, proofing of a job can be launched through the Proofing function from the top level Job List 327 via the Pretool button, or from the "Contents" tab of the Job Properties dialog.

Figure 29:
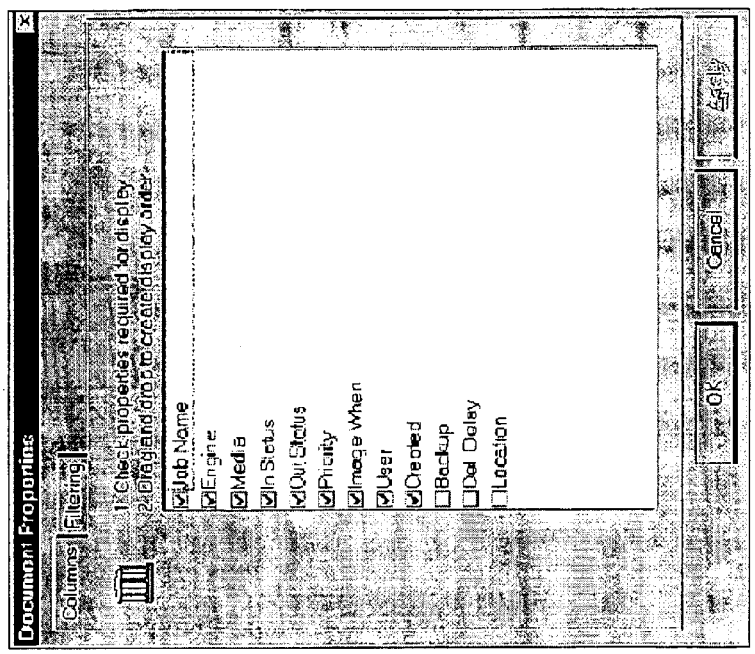
Figure 30:
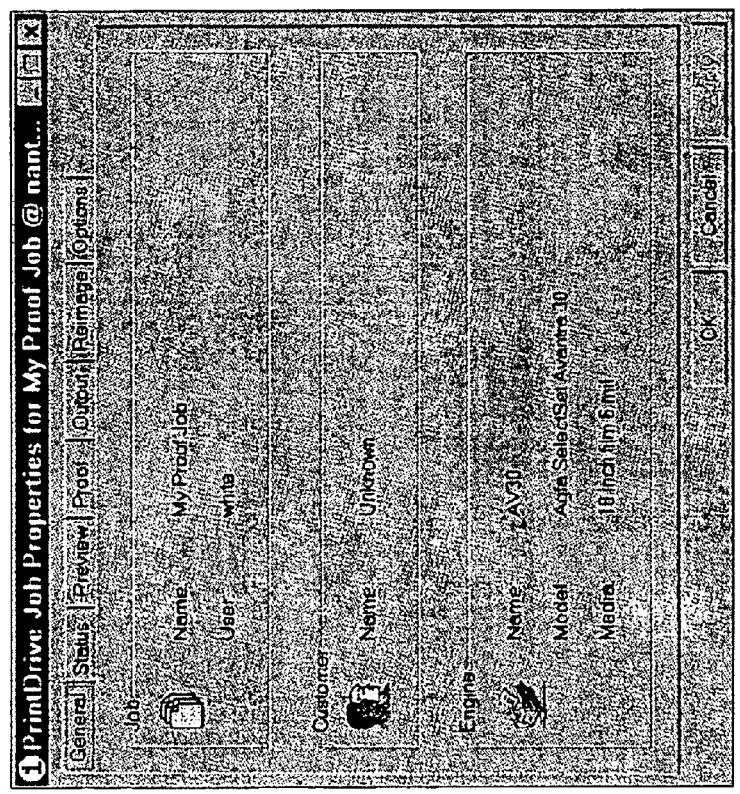

FIGS. 29–30 show how based on user references, different views of the Job List can be constructed. The default view of the job list will be sorted by priority order. Within each priority, the sort order will be by timestamp, meaning that the order of jobs displayed will be in FIFO order. Alternative views of the job list can also be provided. For example, the list can be sorted by media name, engine type, Job ID number, status, etc.

FIG. 29 shows how the default order and columns are displayed. The user may check which columns should appear in the job list, and can drag and drop these items to determine the order that the columns are displayed. The default order and columns displayed are shown FIG. 30 shows how the dialog box which may be used to filter the view and display only certain information. For example, the view may be filtered to show only jobs of High priority, or only jobs queued for imaging to a single device or media type.

The informational items pertaining to a particular job within a Job List are listed in Table 6. When a job is being spooled or imaged, the Job Information fields that are defined as editable cannot be changed.

TABLE 6

| Informational Item | Description | Editable |
|---|---|---|
| Internal ID | Unique identifier assigned by the PrintDrive to a Job List element. This identifier is used as a way to uniquely identify a job within the PrintDrive system. This number will increment up to 6 digits, then wrap around to 1. | No |
| Job Name | The user or system defined name of the selected Job List element (document name) If a user has not defined a name for a job, the Internal Name is used in this item. | No |
| Job Number | Unique job id defined by the application. | No |
| Job Input State | The Input state of the selected Job List element (spooling or complete).) | No |
| Job Output State | The Output status of the selected Job List element. | No |
| Number of Copies Requested | The number of copies requested for a job. | Yes |
| Number of Copies Left to Image | Number of copies requested minus the number of copies already imaged. | No |
| Image When Mode | The current setting of this mode indicates the hold condition that must be satisfied to allow the job to image. | Yes |
| Priority Level | The priority level of the job. | Yes |
| Post Imaging Options | The post imaging options set for the job. One or more of backup, delete, and notify. | Yes |
| Job Enable Output Preference | The current setting of this field indicates what portion of the job should be output when it is taken off Hold. The default for all jobs is image all pages and separations. | Yes |

TABLE 6-continued

| Informational Item | Description | Editable |
|---|---|---|
| Input RIP Name | Host Name of the RIP that sent the job.4<br>4 It is not possible to distinguish individual RIP types (e.g., Taipan, Viper etc.) | No |
| Agfa Engine ID | Agfa Identifier for the type of Engine which the job was directed. | No |
| Engine Name - Target | User defined name for the engine selected when the job was ripped. | No |
| Engine Name - Current | The current engine name that this job will be output on (could be different from the target engine that was specified via the PPD). The user may select a different, but compatible, engine to output the job on. | Yes |
| Media Name - Target | The media name seleclcd via the PPD for the job | No |
| Media Name - Current | The current media name specified for the job (could be different from the target media specified at PRINT time.) | Yes |
| Spool Start Time | Time image started spooling. No spool End Time Time image completed spooling. | No |
| Image Start Time | Time image started outputting. No Image End Time Time image completed outputting. | No |
| File Deletion Preference | The current file deletion preference setting. | Yes |
| Delete Delay Setting | The current setting ot the time to wait after successful imaging/backup before the job will be removed from the job list. | Yes |
| Spooler Settings | The current setting of the spooler preference. No Collation Sequence The current setting of the collation sequence. | Yes |
| Customer Name | Customer's name<br>FUTURE PLACEHOLDERS | No |
| Element Type | Type of element, ex. loose color, page, spread, tile form etc. | No |
| Element ID | Element type ID, ex. lot id, form id, tile id, etc. | No |
| Output Type | Type of output, ex. color fpo, analog color proof, digital imposition proof, etc. | No |
| Separation Name | name identifier of a separation<br>JOB DETAILS | No |
| Separation Size | Number of uncompressed data bytes in the current separation. | No |
| Compressed Size | The Number of compressed data bytes in the current separation. | No |
| Compression Ratio | Separation Size divided by Compressed Size. (For example, 4 indicates a 4 to 1 compression factor). | No |

A number of states are associated with a job while it resides in the PrintDrive system. The user interface will display both input and output states of the job. Possible states are shown in the Tables 7, 8, 9 and 10.

TABLE 7

| State | Description | Icon |
|---|---|---|
| Spooling | The job is currently being input from the RIP. | |
| Complete | The job has been successfully received at the PrintDrive. | |
| Error | An error occurred while the job was being input. | |
| Canceled | The job was canceled during input. | |

TABLE 8

| State | Description | Icon |
|---|---|---|
| Hold | This job will not image without manual intervention | |
| Hold Pending Image When | On hold waiting for Image When condition to be satisfied. | |
| Hold for Preview | The job is awaiting approval from the Preview application. | |
| Hold for Proof | The job is awaiting approval from the Proof application | |
| Hold Pending Priority | This job is on hold waiting for it's priority level to be allowed to output. | |
| Hold Pending Engine | Job waiting for the selected engine to be connected to the PrintDrive. | |
| Hold Pending Media | Job waiting for the selected media to be loaded in the connected engine. | |
| Hold Pending Repair | This job is waiting for a repair flat(s) to be received (using the Quick Fix application) | |
| Imaging | This is the current imaging job. | |
| Complete | This job has imaged successfully, but is waiting to be deleted or backed up. | |
| Ready | All criteria have been met, and the job is ready to be imaged. | |
| Suspended | The output of the job has been suspended - e.g.: due to a paused engine. | |
| Deferred | This job was imageable, but deferred to avoid a spindle change. | |
| Error | An error has occurred during imaging. | |
| Incompatible | Job cannot be output due to incompatibilities between the job and the attached Engine. | |
| Canceled | The job was canceled. | |

TABLE 9

| | |
|---|---|
| Error | An error occurred during the backup. |
| Backing Up | This job is currently backing up. |
| Ready | This job is ready to be backed up. |
| Complete | This job has completed backing up. |
| Canceled | The backup operation was canceled. |

TABLE 10

| | |
|---|---|
| Error | An error occurred during the export. |
| Exporting | This job is currently being exported. |
| Ready | This job is ready to be exported. |
| Complete | This job has completed exporting. |
| Canceled | The export operation was canceled. |

Figure 31:
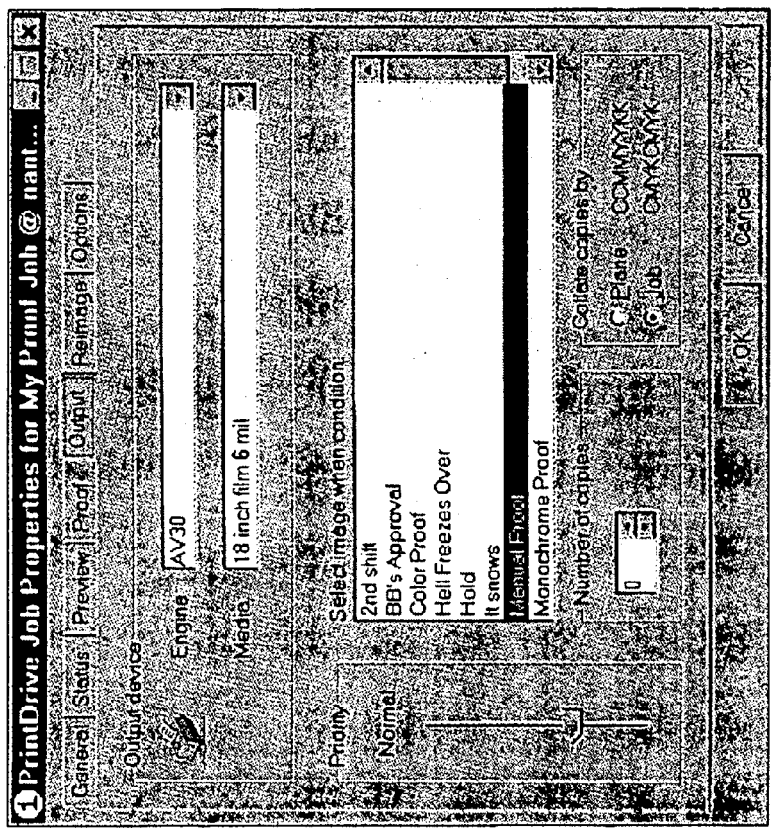

FIGS. 28 and 31 show how from the Job List window 320, the user may select any particular job and view and/or edit properties for that job. The General tab 401 lists general information about the job such as Job Name, RIP User, Customer information, and target engine and media names.

Figure 32:
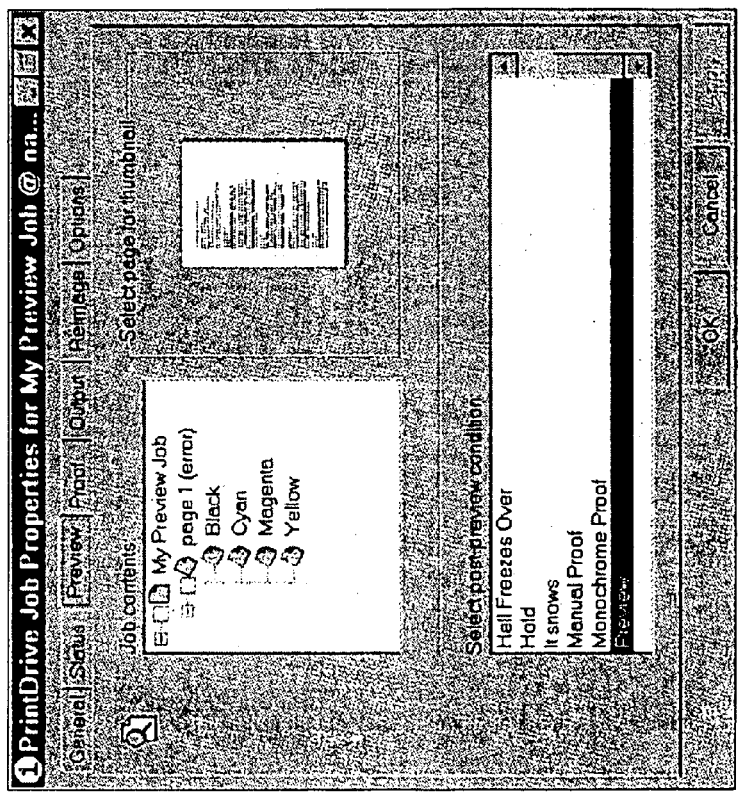
Figure 33:

FIGS. 32–33 show how detailed information about the content of the job, including page, separation, and a thumbnail sketch of the job is provided. Detailed information about the selected job, such as job size, page/plane information, compression ratio, estimate of how long to image (future), and a thumbnail of the job for quick recognition is also provided. The first time that a thumbnail is requested, the PrintDrive server compiles a low resolution representation of high Resolution data stored for each separation. The thumbnails may be viewed as separations or as a Low Resolution color composite of the image job.

FIG. 33 shows how by clicking on the File deletion delay Output tab 430, the user can modify job properties.

The operator can change the Priority Level of any job except the currently imaging job. The possible Priority Levels are; Urgent, High, Normal, and Low. This change could affect when a job images.

The current job always completes imaging before the PrintDrive checks the Job List for the next imageable job. Therefore, changing the priority of the currently imaging job will have no effect on its Job State.

A job can be made urgent from the "quick start" tool button on the job list menu, or from this job properties menu.

A job's Image When Mode is used to determine if and when the job will image. This dialog allows the operator to change the Image When Mode that was selected via the PPD option. The Image When choices are user defined as described above.

A job will image when it becomes its turn to image based on the selected output criteria.

Each job has a set of media characteristics associated with a media name that is assigned to the job by the operator through PPD options. Through the UI, a user can change a job's intended media name, effectively changing the media characteristics. The PrintDrive UI will display a list of valid media names that the user may select from that are valid for the selected engine name, and that remain compatible with the size requirements of the job.

Like changing media name, the user can also elect to direct a given job to a different engine. Again, the PrintDrive UI will evaluate the characteristics of the job and display a list of valid engine names that the user may select from to redirect this job to a different engine. For example, a job within an engine family like the Avantra series will be allowed to be output on a different model Avantra if size requirements and punch configurations match. A job that was ripped for a Capstan engine cannot, however, be redirected to a Drum engine.

If the mode of the currently imaging job is changed to Hold, imaging of that job will still complete. Its Job State will transition from Imaging to Hold Pending, and, finally, to Hold.

Changing a job's mode from Hold to Immediately may make that job the next imageable job if it is that job's turn to image based on the selected output criteria.

Figure 34:
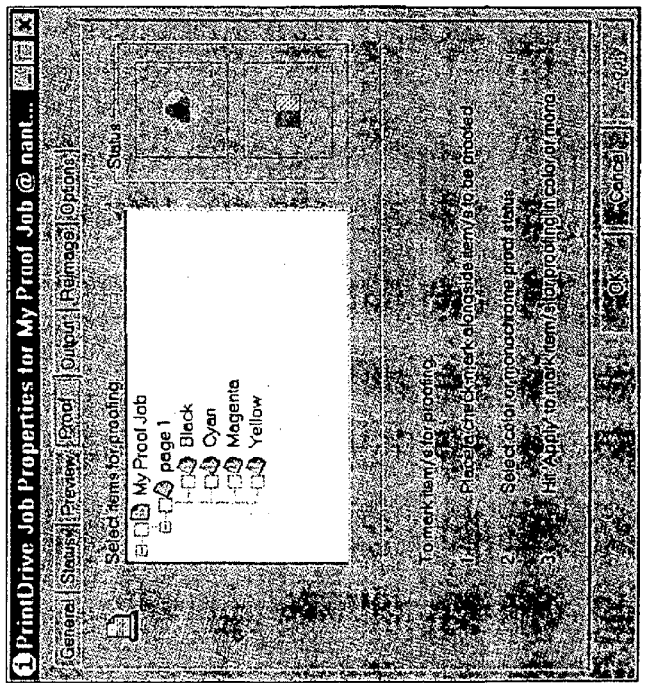

FIG. 34 shows how when "Hold" jobs are changed to "Immediately," a dialogue box 450 will be displayed showing choices for the operator to select which "pages" and/or "separations" to image. The default is to image all pages and separations of a job being made imageable. For example, if a user needs to remake just the black plate of a job that's currently on Hold, they would change the job state to Immediately, select the appropriate page number, and then select a black separation.

Figure 35:
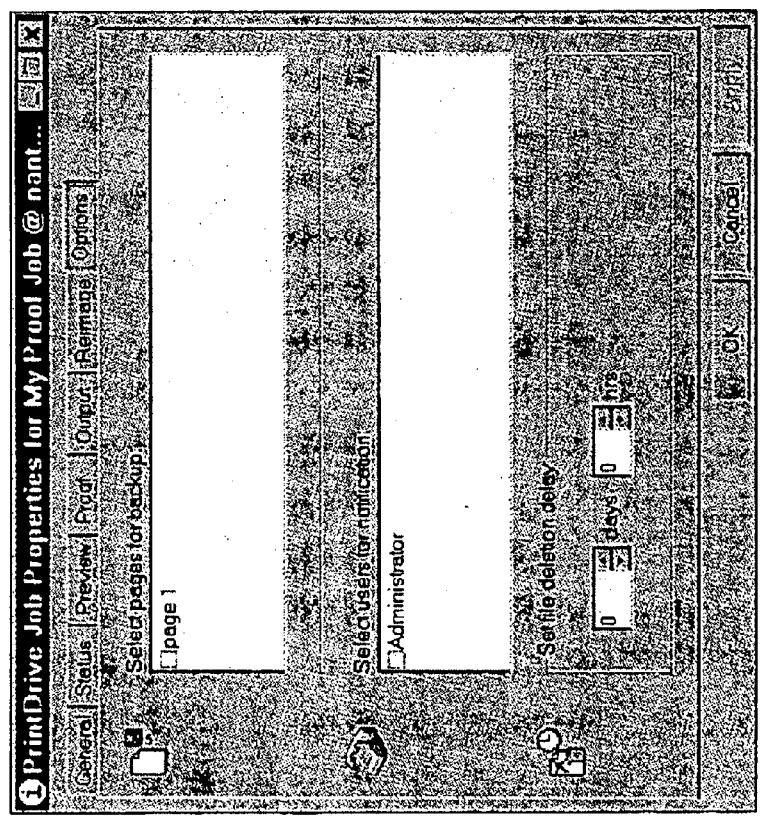

FIG. 35 shows how from the Options tab 470 an operator can change a job's Post Imaging Option. There are three Post Imaging Option choices for a job; Backup, Delete, and Notify. These options take affect after a job has imaged successfully. These are not mutually exclusive, that is the operator can specify all or none of these options per job.

Backup specifies that the job is to be backed up after it successfully images. A separate dialog from the PrintDrive user interface will allow the operator to initiate the backup operation to external media. Delete specifies that the job is deleted after imaging and/or backing up. This option is subject to the File Deletion Preference set in the PrintDrive Tuner. Notify specifies that the user wants a notification after a job successfully images and/or errors. The notification method is specified in the PrintDrive Tuner Application.

Change Number of Copies

A Number of Copies field in a Job List entry will specify the number of times a particular job is imaged. The default for all jobs is one (1) copy. This field can be edited by the PrintDrive operator via a UI. Refer to 5.2.5—Number of Copies Setup for information on how this parameter is associated with the job. [??? GUI must track original number of copies if modified???]

Change Collation Sequence

The collation sequence can be modified on a per job basis from the Job Properties dialog. Output TAB Change File Deletion Delay The default file deletion delay time-out is specified via the PrintDrive Tuner. This can be overridden on a per job basis from the Job Properties dialog.

Figure 36:
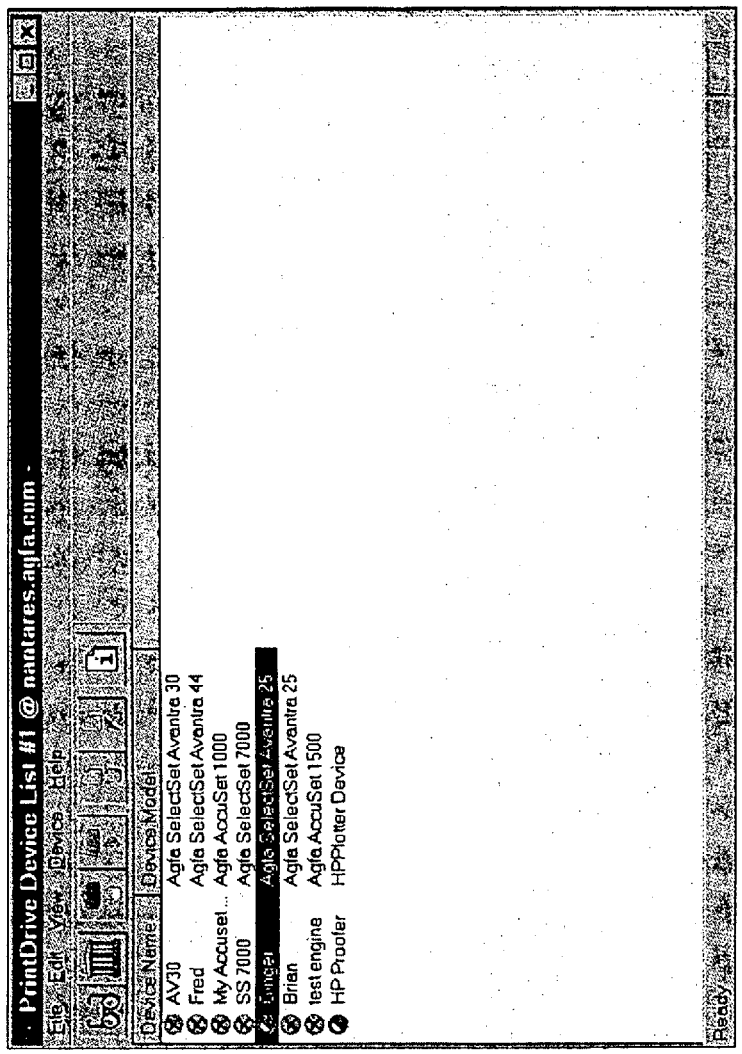

FIG. 36 shows how through the PrintDrive Pilot, the user is provided a mechanism for monitoring and controlling the currently connected device(s). The Device List dialog box 500 shows the currently defined engines that were defined in the PrintDrive Tuner. From this top level view, properties about each device may be displayed.

Through the Device List dialog box 500, the engine status is displayed (e.g.: idle, OnLine Busy, Pause, etc.), loaded media, along with information about the currently imaging job, as shown in FIG. 36. Detailed status information is also available for display in a scrolling window (like the RIP device status window displays DevAPI messages).

Figure 37:
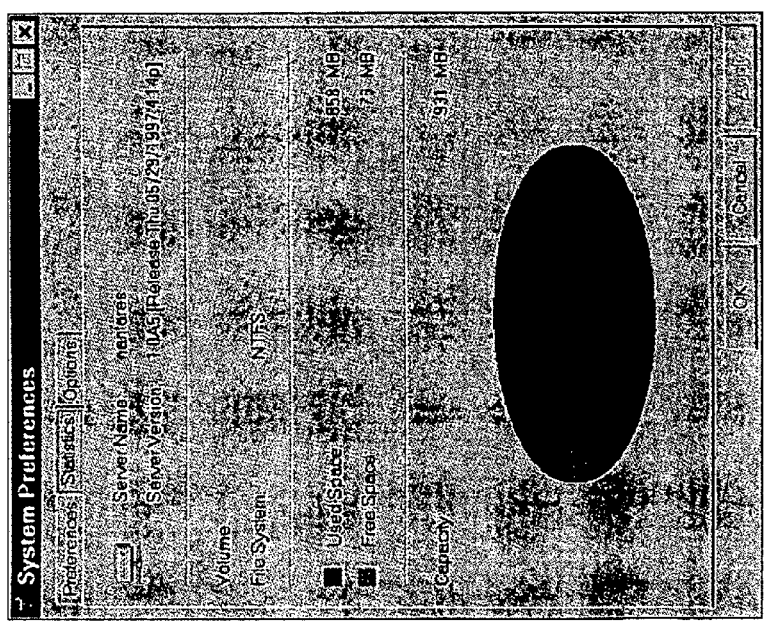

FIG. 37 shows how through a Job Control GUI, selectable ways for the operator to disable output from the PrintDrive to a particular Engine is provided. Three choices are available. The Pause Job function stops output between planes of the currently imaging job. The Off Line function will take effect after the currently imaging job is complete. This function is useful for temporarily disabling output while changing media loaded at the engine. The Cancel Job function stops imaging immediately. When applied to the currently imaging job, Cancel will cause the Engine to be RESET. The Engine RESET clears the Engine imaging operation. The job's state at the PrintDrive is set to Canceled and its Job List entry and data remain available for retry or manual deletion.

Figure 38:
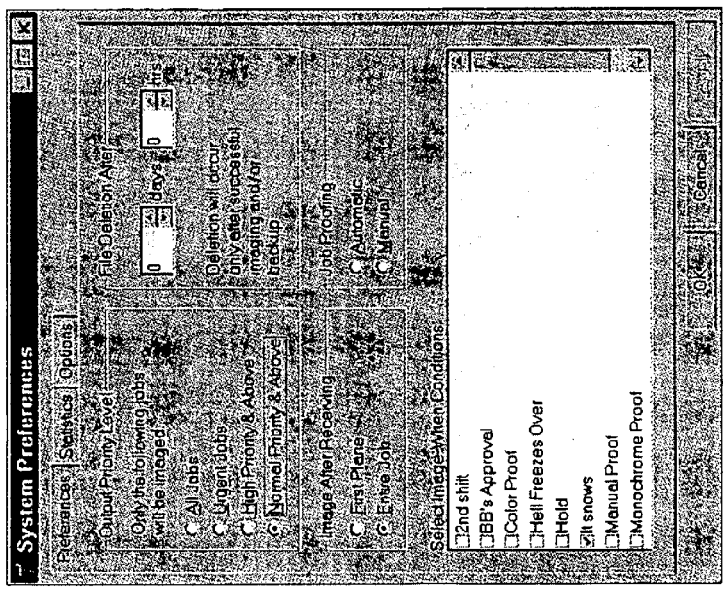
Figure 40:
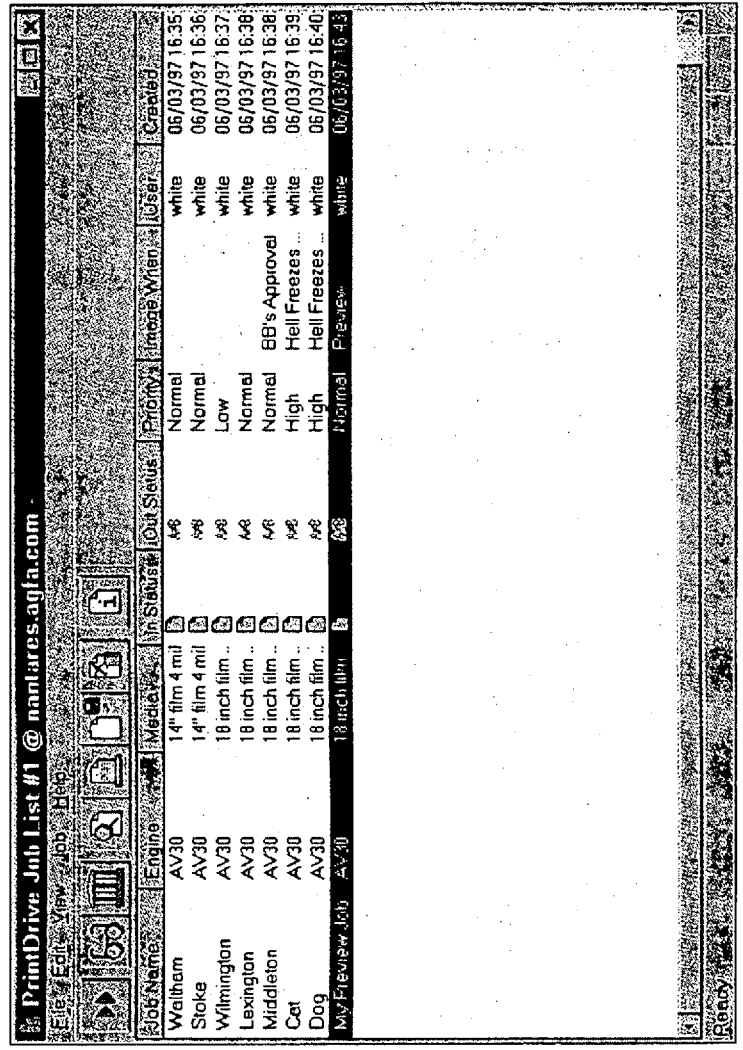
Figure 41:
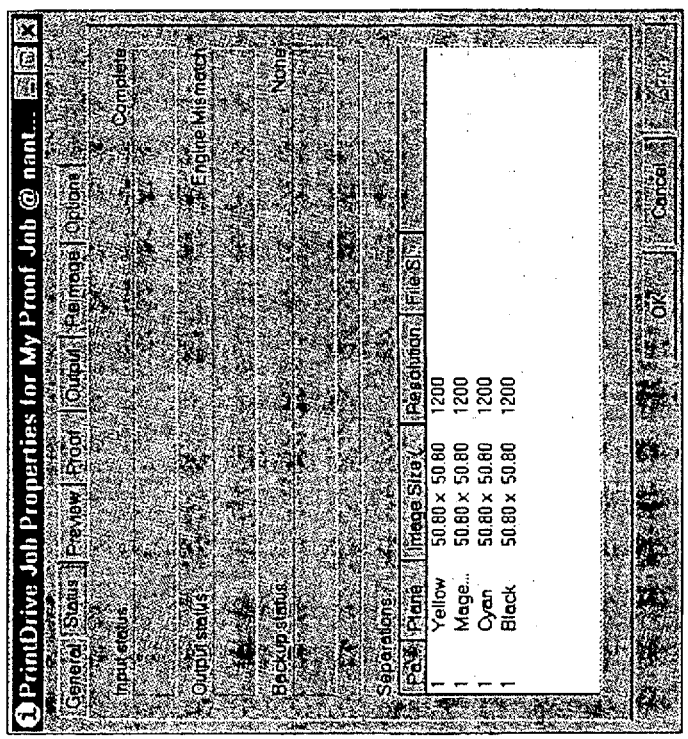
Figure 43:
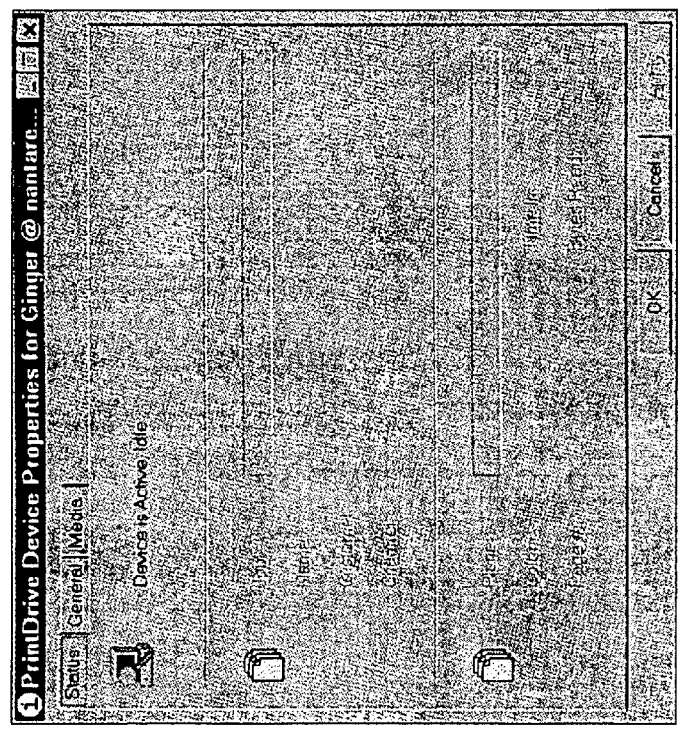
Figure 44:
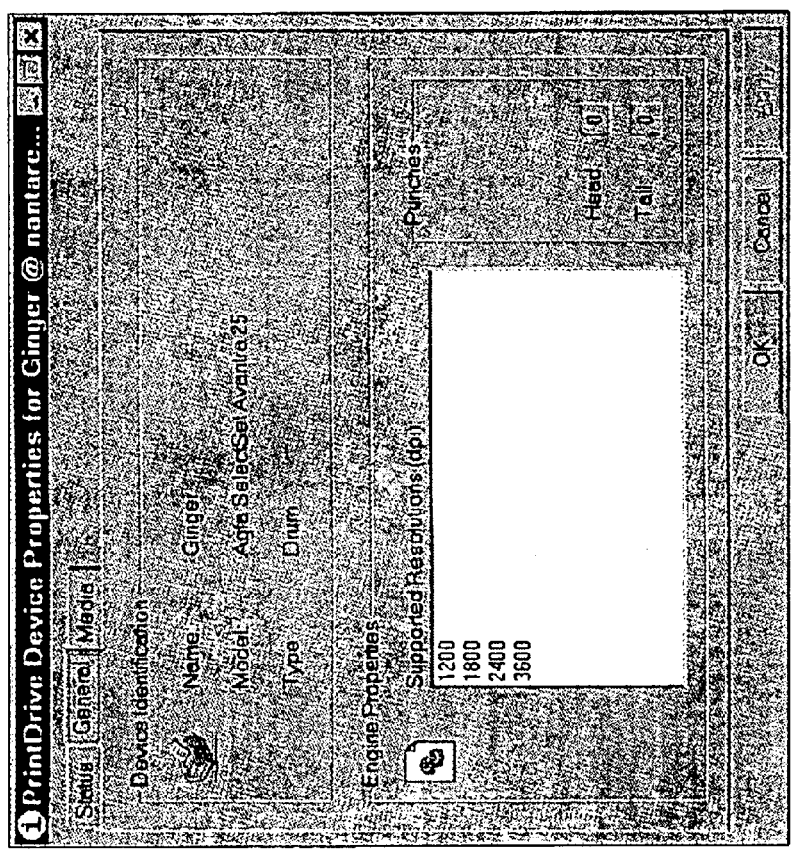
Figure 45:
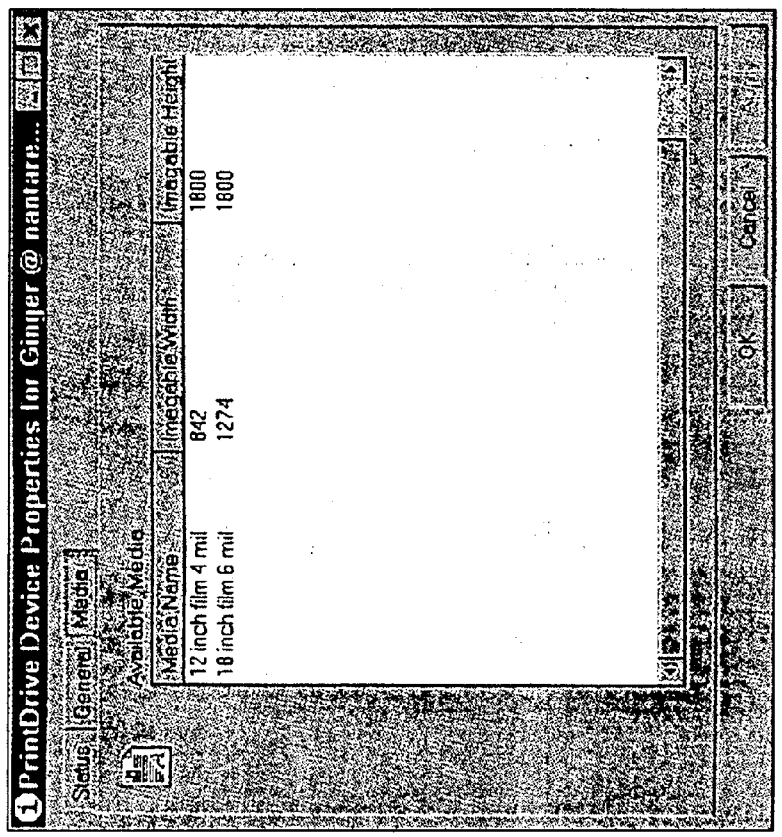
Figure 46:
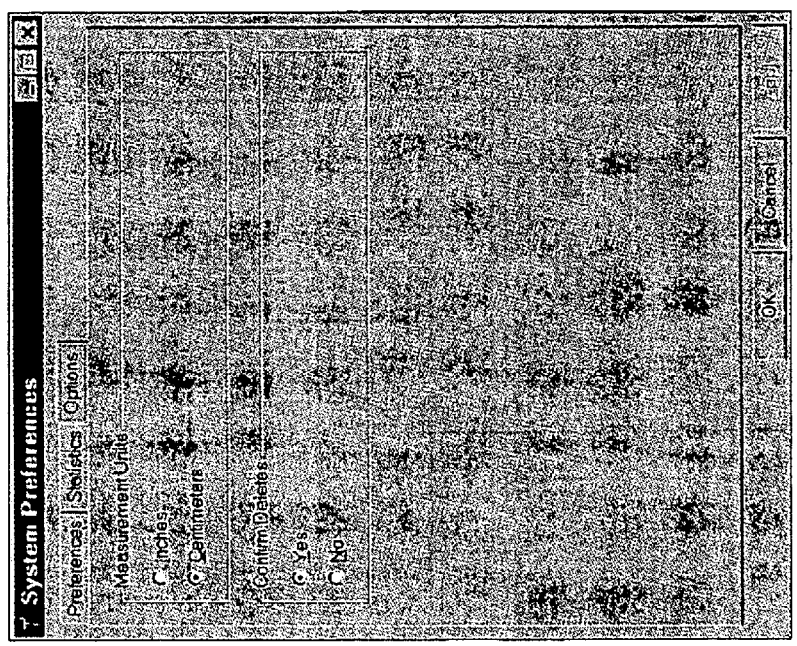

FIG. 38 shows how The Preferences option from the PrintDrive Pilot window provides statistics and output preference settings. The Statistics tab allows retrieval of information about PrintDrive disk capacity and usage. The Preferences tab provides global output operating preferences.

Figure 39:
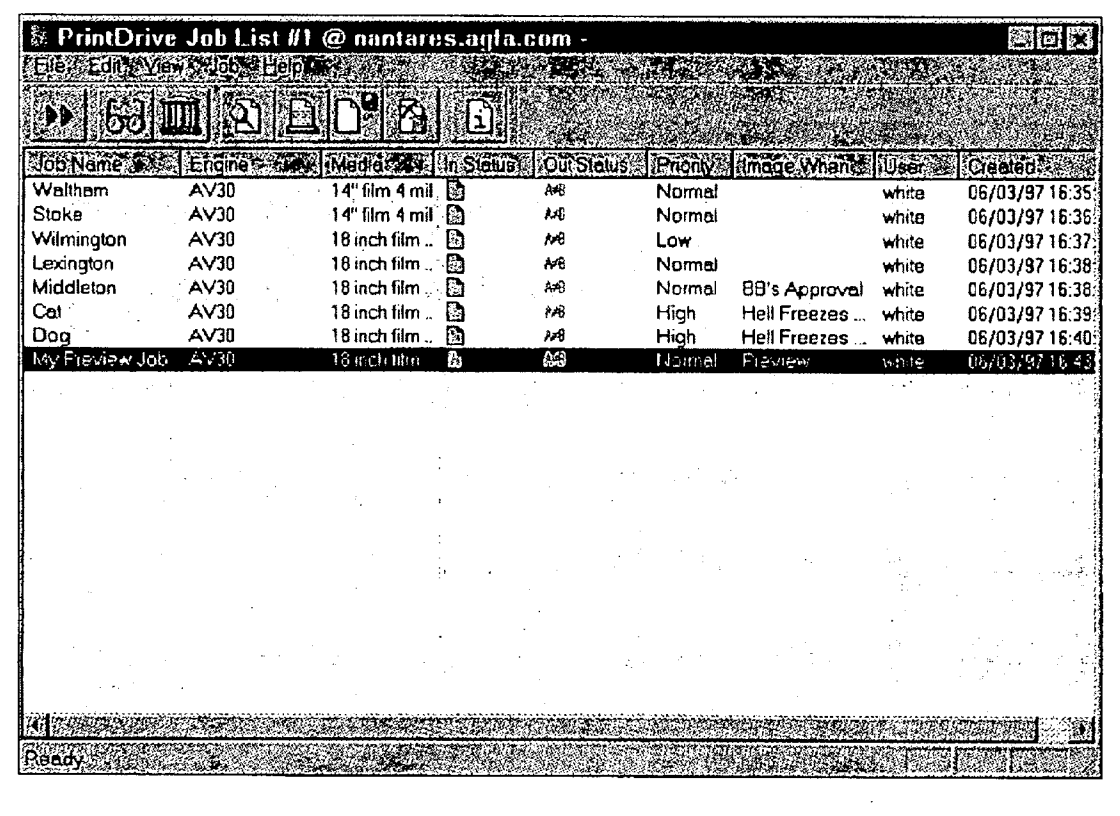

FIG. 39 shows how from the System Preferences dialog box 600, the user is provided with a way to customize and choose the output criteria for the PrintDrive, meaning that these settings affect the entire job list. There are several different criteria on which the user can base the output of jobs. They are set globally, but may be edited on a per job basis if desired, as described earlier. FIG. 39 further illustrates the types of Output Preferences that can be applied globally to the PrintDrive job list. It provides a means for indicating that an Image When condition(s) has been satisfied, input spooling preference, and job priority selection preference.

The user selects a priority level to assign to each job via the PPD options. Once the job is received at the PrintDrive, this priority setting allows the PrintDrive Output Picker to base the order of the output based upon Priority Level. From the PrintDrive user interface, the user may further restrict which jobs get output based upon specific priority level. They may choose to only image jobs having priority of (1) All jobs, (2) Urgent only, (3) High and above, or (4) Normal and above. These preferences always take precedence over all other Output Imaging Preferences. Jobs that do not meet the priority level of this preference are not allowed to output. This also provides a way to shutdown the output to allow higher priority job(s) to get immediate attention for output. The default for this preference is output all jobs.

As described earlier, the user may assign an Urgent priority to a specific job or jobs. This provides a mechanism for placing a job(s) at the top of the imaging list, above all others (except the currently imaging job). The user, via a PPD option, can specify an Image When Condition that needs to be satisfied before a job is allowed to image. Through this user interface, the operator can specify that one or more of these Image When conditions, has been satisfied. The system will then begin to image all jobs automatically which were waiting on that condition. The Image When conditions are defined by the user via the PrintDrive Tuner, as described above.

After an operator manually specifies which Output Condition(s) are enabled, this preference can be used to begin an unattended operation. A user may associate a date and time with these conditions to provide even more automation.

A job is made up of 1 or more pages, and pages are made up of 1 or more planes. The operator can choose exactly when to begin imaging a job. The choice is specified via the UI through the Spooler Settings preference. Either wait for the whole job to be received at the PrintDrive or begin imaging immediately after the 1st plane is completely received. The default is to begin imaging immediately after the 1 st plane is received.

A preference setting to indicated desired units of measure can be set from this menu. Choices are Inches or Centimeters. Where appropriate throughout the PrintDrive user interface, measurement units will be displayed in the chosen format.

The PrintDrive will use a couple of different logfiles to log information about the product. The Windows NT Event Log is used to log service information, such as when the PrintDrive service starts or stops.

A Job Logger component in the PrintDrive will keep a history of operations, states, and any other information that could be deemed useful for system accountability. The same job logger from the Taipan 2.0 RIP will be reused by the PrintDrive.

The PrintDrive supports an application for Exporting jobs to an external media source, or to a remote machine over a network connection. This operation is manually invoked from the PrintDrive Pilot, that is, there is no automatic import/export function supported. Only jobs marked as "Hold" are allowed to be selected for Export.

The export/import device (e.g.: R/W Optical) must be installed locally on the PrintDrive workstation. This is required to achieve the best performance of the system (avoiding network transfer of the file). Devices receiving exported PrintDrive jobs must be "file devices", that is, they are directly accessible by the NT operating system and capable of accepting NT files. Jobs may also be exported via a modem connection to a remote PrintDrive system using the TCP/IP protocol.

Importing jobs into the PrintDrive provides a way for jobs from an external source to be entered onto the PrintDrive Job List. The imported jobs will appear to the PrintDrive Application the same as jobs that are input from a RIP. All job information (e.g.: job name, engine name, media name, etc.) is exported/imported with the job. If a job is imported into a PrintDrive system that specifies an engine or media name not configured on the receiving PrintDrive, that job will still be entered into the job list, but will be marked in "error" due to incompatible media or engine name. The user can then modify the job properties to correct this situation.

Virtual Cassette Mode is a function available to a customer with a multiple spindle Engine and an on-line processor. When both input spindles contain the exact same kind of media (type, size and thickness), the PrintDrive will automatically switch from one spindle to the other when a low media condition is recognized on the current input spindle. This function is always enabled on the PrintDrive.

The PrintDrive can choose to output a job to the spindle that uses less media based on the image size. This optimization does no rotation of the video data.

The error handling philosophy in the PrintDrive will be quite similar to that used by the prior art. The following sections describe the error handling for input errors and output errors. The only input errors that can be flagged on the PrintDrive are disk full errors. There are two circumstances under which this error could occur. The first and most common time is when a job begins its communication with the PrintDrive at input time. The PrintDrive receives the size of an individual separation of the job up front from the RIP and estimates, based on a worst case compression ratio, how much disk storage the separation needs. When there is not enough disk space, the disk is considered full.

Although preferred embodiments are specifically illustrated and described herein, it would be appreciated and understood that modifications and variations of the present invention are covered by the above teachings and within the purview of the appended claims without departing from the spirit and intended scope of the invention. For example, it will be readily understood that a plurality of icons having various designs and shapes can be used to represent a cancel, delete or hold command, and so on.

It further noted that FIGS. 40–46 have been presented to show other additional views of the GUI of the present invention.

What is claimed is:

1. An electronic prepress system for managing and controlling the workflow of a plurality of image files to a plurality of user selectable output devices, said system comprising:
   at least one front end device for generating page description language data into image files;
   at least one raster image processor for receiving the image files from said front end device and for converting the page description language data into raster data;
   a plurality of user selectable output devices, including a virtual engine; and
   a print drive for receiving said raster data from said raster image processor, for managing and controlling the workflow of said raster data to the plurality of user selectable output devices, and for establishing a virtual connection with the virtual engine upon selection of the virtual engine by a user.

2. The system of claim 1 wherein at least one of the user selectable output devices comprises a hardware device for printing raster data on film or other media.

3. The system of claim 1 wherein at least one of the user selectable output devices comprises a printer.

4. The system of claim 1 wherein at least one of the user selectable output devices comprises a proofer for receiving the raster data from said print drive, said proofer being adapted to preview the raster data.

5. The system of claim 1 wherein at least one of the user selectable output devices comprises a storage device for receiving the raster data from said print drive, said storage device being adapted to store and return the raster data to said print drive.

6. The system of claim 5 wherein said storage device comprises an external disk drive for receiving the raster data from said print drive, said disk drive being adapted to store and return the raster data to said print drive.

7. The system of claim 1 wherein said print drive is configured on a standard PC based platform running Windows NT Operating System.

8. The system of claim 1 wherein said print drive is configured with a Tuner graphic user interface.

9. The system of claim 8 wherein said Tuner graphic user interface interacts with each front end device to provide a user modifiable and selectable list of compatible output devices and media.

10. The system of claim 9 wherein said Tuner graphic user interface provides a user modifiable and selectable list of workflow conditions for processing said image files depending upon the status of said conditions.

11. The system of claim 1 wherein said print drive interacts with a graphics user interface associated with a host computer system, said graphics user interface for controlling the workflow of image files to the plurality of user selectable output devices.

12. The system of claim 11 wherein said graphic user interface is a Pilot graphic user interface supported remotely on a host PC or Macintosh™ platform.

13. The system of claim 12 wherein said print drive interacts with said Pilot graphic user interface so that page description language data is processed into raster data without said user selectable output devices being attached to said system.

14. The system of claim 1 further comprising a plurality of front end devices.

15. The system of claim 1 further comprising a plurality of raster image processors.

16. The system of claim 1 further comprising a plurality of print drivers.

17. A method for managing and controlling a plurality of output files in an electronic prepress system, said output files comprising raster data, said method comprising the steps of:
   creating a graphics image file;
   processing the graphics image file with at least one raster image processor to transform the graphics image file into an output file containing raster image data;
   providing a plurality of user selectable output devices, including a virtual engine;
   transferring the raster image data output file to a print drive for managing and controlling the workflow of said raster image data output file to the plurality of user selectable output devices; and
   establishing a virtual connection between the print drive and the virtual engine upon selection of the virtual engine by a user.

18. The method of claim 17 wherein said print drive includes a first graphical user interface and a second graphical user interface, wherein said first graphical user interface is adapted to configure, manage and control said print drive, and wherein said second graphical user interface is adapted to interact with said electronic prepress system.

19. The method of claim 17 further wherein said selectable output devices are selected from the group consisting of a printer, an imagesetter, a platemaker, a digital proofer, a storage device and a raster image processor.

20. The method of claim 17 further comprising the step of selecting a condition precedent for temporal transfer of the output files to the output device.

21. A method of processing and transferring an image file containing raster image data to a virtual output device utilizing a print drive for an electronic prepress system, said print drive having a graphic user interface for managing and controlling a plurality of output files containing raster image data, wherein said print drive is configured for managing and controlling said image files emanating from at least one raster image processor, said method comprising the steps of:

selecting an output device selected from the group consisting of a printer, an imagesetter, a platemaker, a digital proofer, a storage device and a raster image processor; and utilizing said graphical user interface to configure said selected output device with a virtual connection to said print drive output;

wherein image files containing raster image data are transferred to said print drive for the eventual transfer to said virtual output device.

22. The method of claim 21 further comprising the step of selecting a condition precedent for temporal transfer of the image file to the virtual output device.

23. An electronic prepress system for managing and controlling the workflow of a plurality of image files to a plurality of user selectable output devices, said system comprising:

at least one front end device for generating page description language data into image files;

at least one raster image processor for receiving the image files from said front end device and for converting the page description language data into raster data;

a plurality of user selectable output devices, including a virtual engine; and a print drive, configured with a Tuner graphical user interface, for receiving said raster data from said raster image processor, for managing and controlling the workflow of said raster data to the plurality of user selectable output devices, and for establishing a virtual connection with the virtual engine upon selection of the virtual engine by a user, wherein the Tuner graphic user interface provides user control of a condition precedent to temporal transfer of each of the image files to respective output devices.

24. A method for managing and controlling a plurality of output files in an electronic prepress system, said output files comprising raster data, said method comprising the steps of:

creating a graphics image file;

processing the graphics image file with at least one raster image processor to transform the graphics image file into an output file containing raster image data;

providing a plurality of user selectable output devices, including a virtual engine;

transferring the raster image data output file to a print drive for managing and controlling the workflow of said raster image data output file to the plurality of user selectable output devices, wherein said print drive includes a first graphical user interface and a second graphical user interface, wherein said first graphical user interface adapted to configure, manage and control said print drive, and wherein said second graphical user interface is adapted to interact with said electronic prepress system;

establishing a virtual connection between the print drive and the virtual engine upon selection of the virtual engine by a user; and configuring the virtual engine with said first user graphical interface, said virtual engine being selected from the group consisting of a printer, an imagesetter, a platemaker, a digital proofer, a storage device and a raster image processor; wherein the raster image data output file is transferred to the print drive for the eventual transfer to the virtual engine.

\* \* \* \* \*